United States Patent
Muramatsu et al.

(10) Patent No.: US 11,964,608 B2
(45) Date of Patent: Apr. 23, 2024

(54) VEHICULAR LAMP SYSTEM, LIGHT DISTRIBUTION CONTROL DEVICE, AND LIGHT DISTRIBUTION CONTROL METHOD

(71) Applicant: KOITO MANUFACTURING CO., LTD., Tokyo (JP)

(72) Inventors: Takao Muramatsu, Shizuoka (JP); Yuta Maruyama, Shizuoka (JP); Yuichi Watano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/475,285

(22) Filed: Sep. 27, 2023

(65) Prior Publication Data

US 2024/0017663 A1 Jan. 18, 2024

Related U.S. Application Data

(63) Continuation of application No. PCT/JP2022/017209, filed on Apr. 6, 2022.

(30) Foreign Application Priority Data

Apr. 16, 2021 (JP) .................................. 2021-069942

(51) Int. Cl.
*B60Q 1/14* (2006.01)
*H05B 47/125* (2020.01)

(52) U.S. Cl.
CPC ........... *B60Q 1/143* (2013.01); *H05B 47/125* (2020.01)

(58) Field of Classification Search
CPC .................................................. H05B 47/125
See application file for complete search history.

(56) References Cited

U.S. PATENT DOCUMENTS

2020/0114805 A1 4/2020 Ridler et al.
2020/0238895 A1 7/2020 Shibata

FOREIGN PATENT DOCUMENTS

JP 2007182214 A 7/2007
JP 2011111000 A 6/2011
(Continued)

OTHER PUBLICATIONS

International Preliminary Report on Patentability Chapter I (PCT/IB/373) with translation dated Oct. 12, 2023 by The International Bureau of WIPO in corresponding International Patent Application No. PCT/JP2022/017209. (8 pages).
(Continued)

*Primary Examiner* — Jason M Han
(74) *Attorney, Agent, or Firm* — BUCHANAN INGERSOLL & ROONEY PC

(57) ABSTRACT

A vehicular lamp system includes a light distribution control device that controls a first lamp unit and a second lamp unit. The light distribution control device forms a combined high-illuminance pattern in a region where no target is present. Meanwhile, the light distribution control device forms a combined shading pattern in regard to a forward vehicle. Furthermore, in regard to a specific target, the light distribution control device controls the first lamp unit so as to form an illuminance fixed pattern, controls the second lamp unit so as to form an illuminance fixed pattern or to form an illuminance adjusted pattern, and forms a combined mid-illuminance pattern by superposing the light distribution patterns that the first lamp unit and the second lamp unit form.

11 Claims, 12 Drawing Sheets

(56) References Cited

FOREIGN PATENT DOCUMENTS

| | | |
|---|---|---|
| JP | 2016088224 A | 5/2016 |
| JP | 2020117155 A | 8/2020 |
| WO | 2020208818 A1 | 10/2020 |

OTHER PUBLICATIONS

International Search Report (PCT/ISA/210) with translation dated May 31, 2022 by the Japanese Patent Office as the International Searching Authority for International Application No. PCT/JP2022/017209. (6 pages).

VEHICULAR LAMP SYSTEM, LIGHT DISTRIBUTION CONTROL DEVICE, AND LIGHT DISTRIBUTION CONTROL METHOD

CROSS-REFERENCE TO RELATED APPLICATIONS

This application is based upon and claims the benefit of priority from the prior Japanese Patent Application No. 2021-069942, filed on Apr. 16, 2021, and the International Patent Application No. PCT/JP2022/017209, filed on Apr. 6, 2022, the entire content of each of which is incorporated herein by reference.

BACKGROUND

Field of the Invention

The present invention relates to vehicular lamp systems, light distribution control devices, and light distribution control methods.

Description of the Related Art

Adaptive Driving Beam (ADB) control has been proposed in recent years that dynamically and adaptively controls light distribution patterns based on the circumstances surrounding the vehicle. ADB control detects with a camera the presence of a dimming target that is located ahead of the host vehicle and that should not be illuminated with high-luminance light, and dims the light directed toward the region corresponding to that dimming target (see, for example, patent document 1). Examples of such dimming targets include a forward vehicle, such as a leading vehicle or an oncoming vehicle. Dimming the light directed toward the region corresponding to a forward vehicle can reduce glare on the driver of the forward vehicle and can also improve the visibility of the driver of the host vehicle.

Patent document 1: JP2016-088224

In conventional ADB control, mainly forward vehicles are considered for dimming targets. The present inventors have conducted diligent studies and, as a result, found that light reflective objects, such as road signs, roadside markers (delineators), or signboards, are also important dimming targets. Specifically, vehicular lamps are increasingly becoming of higher luminance in recent years, and the intensity of light reflected by light reflective objects tends to be higher than before. Therefore, high-luminance light reflected from light reflective objects may cause glare on the driver of the host vehicle and reduce the driver's visibility.

SUMMARY OF THE INVENTION

The present invention has been made in view of such circumstances, and one object of the present invention is to provide a technique that can increase the visibility of the driver of the host vehicle.

One aspect of the present invention provides a vehicular lamp system. This vehicular lamp system includes a first lamp unit and a second lamp unit each capable of forming a light distribution pattern of a variable intensity distribution, and a light distribution control device that controls formation of light distribution patterns by the first lamp unit and the second lamp unit in accordance with a target included in an image that is based on an imaging device. The light distribution control device, in regard to a region where the target is not present, controls at least one of the first lamp unit or the second lamp unit so as to form high-illuminance patterns at a predetermined illuminance, and forms a combined high-illuminance pattern by superposing the light distribution patterns that the first lamp unit and the second lamp unit form; in regard to a forward vehicle among the targets, controls the first lamp unit and the second lamp unit so as to form shading patterns that are not dependent on a luminance of the image at an illuminance lower than the illuminance of the high-illuminance patterns, and forms a combined shading pattern by superposing the shading patterns that the first lamp unit and the second lamp unit form; and in regard to a specific target, among the targets, for which a combined mid-illuminance pattern is to be formed at an illuminance lower than an illuminance of the combined high-illuminance pattern and higher than an illuminance of the combined shading pattern, controls the first lamp unit so as to form an illuminance fixed pattern that is not dependent on the luminance of the image, controls the second lamp unit so as to form an illuminance fixed pattern that is not dependent on the luminance of the image or to form an illuminance adjusted pattern of which an illuminance is adjusted to bring a luminance of the specific target in the image closer to a target luminance, and forms the combined mid-illuminance pattern by superposing the light distribution patterns that the first lamp unit and the second lamp unit form.

Another aspect of the present invention provides a light distribution control device that controls formation of light distribution patterns by a first lamp unit and a second lamp unit that are each capable of forming a light distribution pattern of a variable intensity distribution in accordance with a target included in an image that is based on an imaging device. This light distribution control device, in regard to a region where the target is not present, controls at least one of the first lamp unit or the second lamp unit so as to form high-illuminance patterns at a predetermined illuminance, and forms a combined high-illuminance pattern by superposing the light distribution patterns that the first lamp unit and the second lamp unit form; in regard to a forward vehicle among the targets, controls the first lamp unit and the second lamp unit so as to form shading patterns that are not dependent on a luminance of the image at an illuminance lower than the illuminance of the high-illuminance patterns, and forms a combined shading pattern by superposing the shading patterns that the first lamp unit and the second lamp unit form; and in regard to a specific target, among the targets, for which a combined mid-illuminance pattern is to be formed at an illuminance lower than an illuminance of the combined high-illuminance pattern and higher than an illuminance of the combined shading pattern, controls the first lamp unit so as to form an illuminance fixed pattern that is not dependent on the luminance of the image, controls the second lamp unit so as to form an illuminance fixed pattern that is not dependent on the luminance of the image or to form an illuminance adjusted pattern of which an illuminance is adjusted to bring a luminance of the specific target in the image closer to a target luminance, and forms the combined mid-illuminance pattern by superposing the light distribution patterns that the first lamp unit and the second lamp unit form.

Yet another aspect of the present invention provides a light distribution control method of controlling formation of light distribution patterns by a first lamp unit and a second lamp unit that are each capable of forming a light distribution pattern of a variable intensity distribution in accordance with a target included in an image that is based on an imaging device. This light distribution control method includes, in regard to a region where the target is not present, controlling at least one of the first lamp unit or the second lamp unit so as to form high-illuminance patterns at a predetermined illuminance, and forming a combined high-illuminance pattern by superposing the light distribution patterns that the first lamp unit and the second lamp unit form; in regard to a forward vehicle among the targets, controlling the first lamp unit and the second lamp unit so as to form shading patterns that are not dependent on a luminance of the image at an illuminance lower than the illuminance of the high-illuminance patterns, and forming a combined shading pattern by superposing the shading patterns that the first lamp unit and the second lamp unit form; and in regard to a specific target, among the targets, for which a combined mid-illuminance pattern is to be formed at an illuminance lower than an illuminance of the combined high-illuminance pattern and higher than an illuminance of the combined shading pattern, controlling the first lamp unit so as to form an illuminance fixed pattern that is not dependent on the luminance of the image, controlling the second lamp unit so as to form an illuminance fixed pattern that is not dependent on the luminance of the image or to form an illuminance adjusted pattern of which an illuminance is adjusted to bring a luminance of the specific target in the image closer to a target luminance, and forming the combined mid-illuminance pattern by superposing the light distribution patterns that the first lamp unit and the second lamp unit form.

It is to be noted that any optional combinations of the constituent elements above or an embodiment obtained by converting what is expressed by the present invention among a method, an apparatus, a system, and so forth is also effective as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
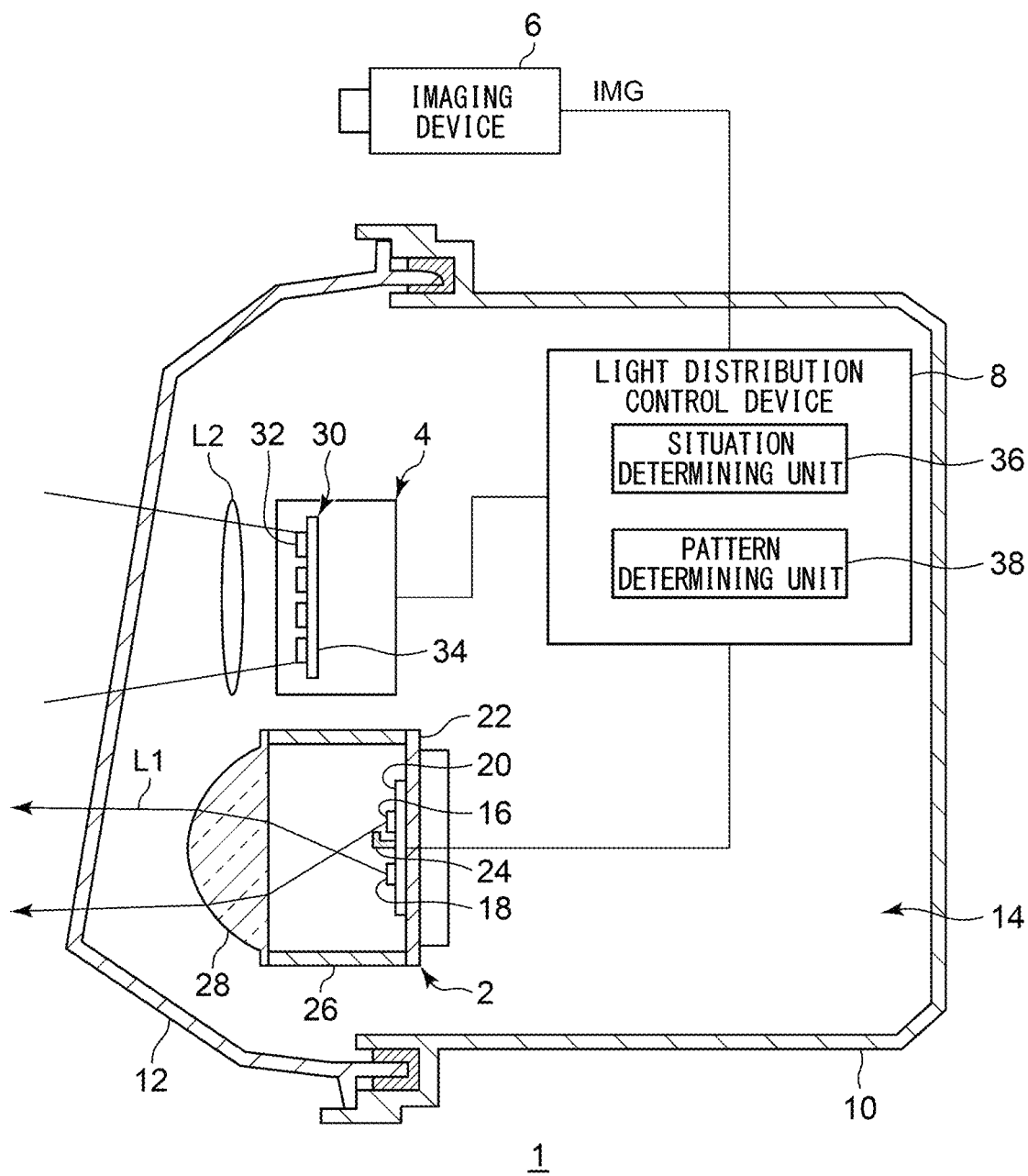
FIG. 1 shows a schematic configuration of a vehicular lamp system according to Embodiment 1.

Hereinafter, the present invention will be described with reference to the drawings and based on some exemplary embodiments. The embodiments are illustrative in nature and are not intended to limit the invention. Not all the features or combinations thereof described according to the embodiments are necessarily essential to the invention. Identical or equivalent constituent elements, members, and processes illustrated in the drawings are given identical reference characters, and duplicate description thereof will be omitted as appropriate.

The scales or shapes of the components illustrated in the drawings are set merely for convenience in order to facilitate an understanding of the description and are not to be interpreted as limiting, unless specifically indicated otherwise. When terms such as "first" and "second" are used in the present specification or in the claims, these terms do not indicate the order or the levels of importance in any way and are merely used to distinguish a given configuration from another configuration, unless specifically indicated otherwise. Part of a member that is not important in describing the embodiments is omitted from the drawings.

Embodiment 1

FIG. 1 shows a schematic configuration of a vehicular lamp system 1 according to Embodiment 1. FIG. 1 depicts some of the constituent elements of the vehicular lamp system 1 in the form of functional blocks. These functional blocks are implemented, in terms of their hardware configuration, by elements and/or circuits, such as a CPU or memory of a computer, or implemented, in terms of their software configuration, by a computer program or the like. It is to be appreciated by a person skilled in the art that these functional blocks can be implemented in a variety of forms through combinations of hardware and software.

The vehicular lamp system 1 includes a first lamp unit 2, a second lamp unit 4, an imaging device 6, and a light distribution control device 8. The vehicular lamp system 1 according to the present embodiment further includes a lamp body 10 and a light transmissive cover 12. The lamp body 10 has an opening that opens toward the front side of the vehicle. The light transmissive cover 12 is mounted so as to cover the opening of the lamp body 10. The lamp body 10 and the light transmissive cover 12 form a lamp room 14. The first lamp unit 2, the second lamp unit 4, and the light distribution control device 8 are disposed inside the lamp room 14. The imaging device 6 is disposed outside the lamp room 14, for example, in the vehicle. In one example, the imaging device 6 is an onboard camera. Herein, the light distribution control device 8 may be provided outside the lamp room 14, for example, in the vehicle. For example, part or the whole of the light distribution control device 8 may be constituted by a vehicle ECU.

The first lamp unit 2 includes a first light source group 16, a second light source group 18, a circuit board 20, a heat sink 22, a shade member 24, a lens holder 26, and a projection lens 28. The first light source group 16 and the second light source group 18 each include a plurality of light sources arrayed in the horizontal direction. The first light source group 16 is disposed above the second light source group 18. Each light source is, for example, a light emitting diode (LED). Herein, each light source may be a semiconductor light emitting element other than an LED, such as a laser diode (LD) or an organic or inorganic electroluminescence (EL) element. Each light source may also be constituted by, for example, an incandescent lamp, a halogen lamp, or a discharge lamp.

The first light source group 16 and the second light source group 18 are mounted on the circuit board 20. The circuit board 20 is a heat conductive, insulating substrate formed, for example, of ceramics. On or in the circuit board 20, electrodes are formed that transfer electric power to the first light source group 16 and the second light source group 18. The circuit board 20 is configured to be capable of controlling light of each light source of at least the second light source group 18 independently of each other. Therefore, the second light source group 18 can illuminate a region ahead of the host vehicle with a visible light beam L1 of a variable intensity distribution.

The circuit board 20 is mounted on the heat sink 22. The heat sink 22 is supported on the lamp body 10 by a known coupling mechanism (not illustrated). The shade member 24 is fixed on the heat sink 22. The shade member 24 has a ridge portion of a shape corresponding to a cutoff line CL described later. The shade member 24 has its positional relationship with the first light source group 16 defined such that the ridge portion is located in an optical path of light emitted from the first light source group 16.

The lens holder 26 is fixed on the heat sink 22. The lens holder 26 is a substantially cylindrical member that extends in the front-back direction of the lamp and is fixed to the heat sink 22 at its end facing toward the back of the lamp. The projection lens 28 is fixed at the end of the lens holder 26 facing toward the front of the lamp. The projection lens 28 is formed, for example, by a plano-convex aspherical lens and projects an inverted image of a light source image formed in a posterior focal plane onto a virtual vertical screen in front of the lamp. The projection lens 28 is disposed in an optical axis of the first lamp unit 2 such that the posterior focal point of the projection lens 28 substantially coincides with the ridge portion of the shade member 24.

Light emitted from the first light source group 16 passes the vicinity of the ridge portion of the shade member 24 and enters the projection lens 28. The light that has entered the projection lens 28 is projected as substantially parallel light into a space in front of the lamp. At this point, the light from the first light source group 16 is selectively cut off by the ridge portion of the shade member 24 serving as a boundary line. Thus, a light distribution pattern including a cutoff line CL corresponding to the shape of the ridge portion, that is, a low beam light distribution pattern PL is formed in the region ahead of the vehicle.

A visible light beam L1 emitted from the second light source group 18 enters the projection lens 28 without being blocked by the shade member 24. The visible light beam L1 that has entered the projection lens 28 is projected as substantially parallel light into a space in front of the lamp and above the space where the light from the first light source group 16 is projected. This can form a high beam light distribution pattern in the region above the cutoff line.

Herein, the structure of the first lamp unit 2 is not limited to the example described above, and any known structures can be employed. For example, the first light source group 16 and the second light source group 18 may be mounted on separate circuit boards or may be mounted on separate heat sinks. The number or the arrangement of light sources included in each light source group is not limited, either. The first lamp unit 2 does not have to include the projection lens 28. The first lamp unit 2 may include a reflector. The illumination of a visible light beam L1 may be realized by a pattern forming device of a matrix type, such as a digital mirror device (DMD) or a liquid crystal device, or by a pattern forming device of a scan optic type that scans the space in front of the host vehicle with light source light.

The second lamp unit 4 is constituted by a light distribution variable lamp capable of illuminating a region ahead of the vehicle with a visible light beam L2 of a variable intensity distribution. The second lamp unit 4 is supported on the lamp body 10 by a known coupling mechanism (not illustrated). The second lamp unit 4 according to the present embodiment includes a light source array 30. The light source array 30 includes a plurality of light sources 32 arrayed in a matrix and a circuit board 34 capable of controlling light of each light source 32 independently of each other. Preferred examples of a light source 32 include a semiconductor light emitting element, such as an LED, an LD, or an organic or inorganic EL element. The number of the light sources 32, or in other words, the resolving power (the resolution) of the second lamp unit 4 is higher than the number of the light sources of the second light source group 18, or in other words, higher than the resolving power of the first lamp unit 2, and is, for example, from 1,000 pixels to 1,300,000 pixels.

Herein, the structure of the second lamp unit 4 is not limited to the example described above, and any known structures can be employed. The light distribution variable lamp constituting the second lamp unit 4 may be, for example but not limited to, a pattern forming device of a matrix type, such as a DMD or a liquid crystal device, or a pattern forming device of a scan optic type that scans the space ahead of the host vehicle with light source light. The first lamp unit 2 and the second lamp unit 4 may be formed as a single unit.

The imaging device 6 has sensitivity to a visible light range and generates an image IMG by capturing an image of a region ahead of the vehicle. The image IMG that the imaging device 6 acquires is sent to the light distribution control device 8. The imaging device 6 captures an image of a space ahead of the host vehicle repeatedly at predetermined timings and sends an image IMG to the light distribution control device 8 each time the imaging device 6 acquires an image IMG. The image IMG that the light distribution control device 8 acquires may be RAW image data or image data subjected to predetermined image processing by the imaging device 6 or by another processing unit. In the following description, "an image IMG that is based on the imaging device 6" may mean either of RAW image data and data subjected to image processing. The expression "image IMG" may be used without any distinction between these two types of image data.

The light distribution control device 8 controls formation of light distribution patterns by the first lamp unit 2 and the second lamp unit 4 in accordance with a target included in an image IMG that is based on the imaging device 6. The light distribution control device 8 includes, in one example, a situation determining unit 36 and a pattern determining unit 38. The light distribution control device 8 can be constituted by a digital processor. The light distribution control device 8 may be constituted, for example but not limited to, by a combination of a microcomputer including a CPU and a software program or by a field programmable gate array (FPGA) or an application specific IC (ASIC). Each unit of the light distribution control device 8 operates as an integrated circuit constituting the unit executes a program stored in a memory.

Figure 2A:
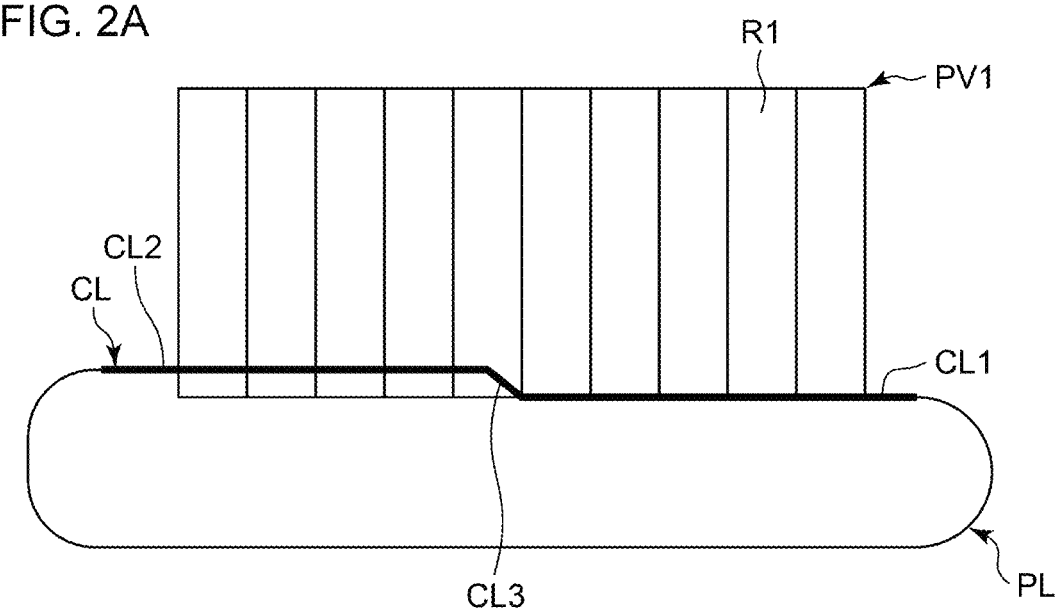
FIG. 2A is a schematic diagram showing a light distribution pattern that a first lamp unit forms.
Figure 2B:
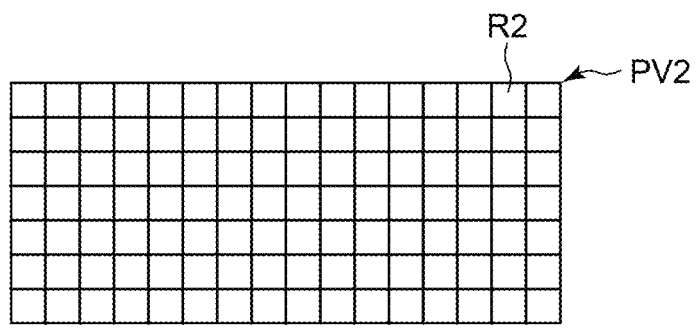
FIG. 2B is a schematic diagram showing a light distribution pattern that a second lamp unit forms.
Figure 2C:
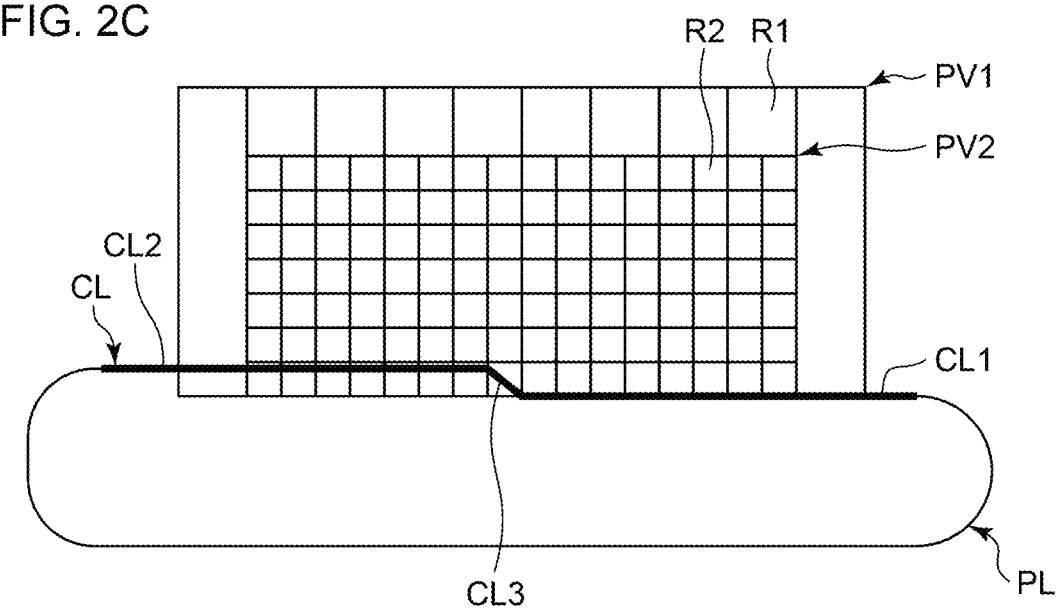
FIG. 2C is a schematic diagram showing how the light distribution pattern that the first lamp unit forms and the light distribution pattern that the second lamp unit forms are combined.

Now, a shape of a light distribution pattern formed by each lamp unit and control, performed by the light distribution control device 8, for forming light distribution patterns will be described. FIG. 2A is a schematic diagram showing a light distribution pattern that the first lamp unit 2 forms. FIG. 2B is a schematic diagram showing a light distribution pattern that the second lamp unit 4 forms. FIG. 2C is a schematic diagram showing how the light distribution pattern that the first lamp unit 2 forms and the light distribution pattern that the second lamp unit 4 forms are combined. A light distribution pattern is understood as a two-dimensional illuminance distribution of an illumination pattern that each lamp unit forms on a virtual vertical screen ahead of the host vehicle. FIGS. 2A to 2C show light distribution patterns for a road where vehicles travel on the left-hand side. The relative positional relationship of the light distribution patterns may vary from the state shown in the figures.

The first lamp unit 2 can form a low beam light distribution pattern PL, as shown in FIGS. 2A and 2C, by projecting light from the first light source group 16. The low beam light distribution pattern PL has a cutoff line CL at its upper end. The cutoff line CL includes a first partial cutoff line CL1, a second partial cutoff line CL2, and a third partial cutoff line CL3. The first partial cutoff line CL1 extends in the horizontal direction in an oncoming lane. The second partial cutoff line CL2 extends in the horizontal direction in the host vehicle's lane and at a position higher than the position of the first partial cutoff line CL1. The third partial cutoff line CL3 extends diagonally between the first partial cutoff line CL1 and the second partial cutoff line CL2 so as to connect the first partial cutoff line CL1 and the second partial cutoff line CL2.

The first lamp unit 2 can form a first light distribution variable pattern PV1 of a variable intensity distribution, as shown in FIGS. 2A and 2C, by projecting a visible light beam L1 from the second light source group 18. The first light distribution variable pattern PV1 is a pattern that overlaps a region above the cutoff line CL of the low beam light distribution pattern PL and is formed, for example, in a region where any known high beam light distribution patterns are to be formed. The first light distribution variable pattern PV1 has a structure formed by a set of partial regions R1 arrayed in the horizontal direction. Each partial region R1, for example, has a rectangular shape elongated in the vertical direction. In one example, the partial regions R1 correspond one-to-one to the light sources of the second light source group 18. The illuminance of each partial region R1 can be adjusted independently of each other by controlling the lit state of each light source. The shape and the arrangement of each partial region R1 can be changed as appropriate along with, for example, a change in the arrangement of each light source of the second light source group 18.

The second lamp unit 4 can form a second light distribution variable pattern PV2 of a variable intensity distribution, as shown in FIGS. 2B and 2C, by projecting a visible light beam L2 from the light source array 30. The second light distribution variable pattern PV2 is formed in a region above the cutoff line CL. The second light distribution variable pattern PV2 is formed so as to overlap the first light distribution variable pattern PV1. The second light distribution variable pattern PV2 has a structure formed by a set of partial regions R2 arrayed in a matrix. In one example, the partial regions R2 correspond one-to-one to the light sources 32. The illuminance of each partial region R2 can be adjusted independently of each other by controlling the lit state of each light source 32.

Figure 3A:
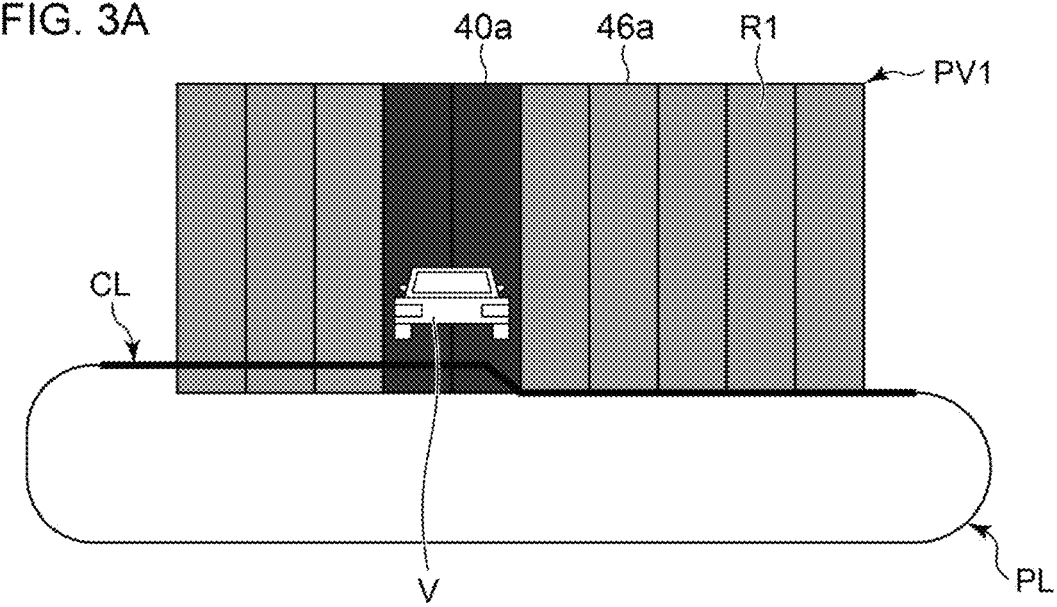
FIGS. 3A, 3B and 3C are schematic diagrams showing light distribution patterns that a first lamp unit and a second lamp unit form in regard to a forward vehicle.
Figure 3B:
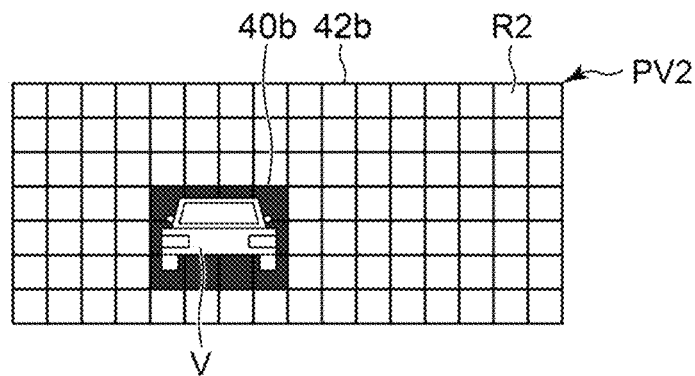
Figure 3C:
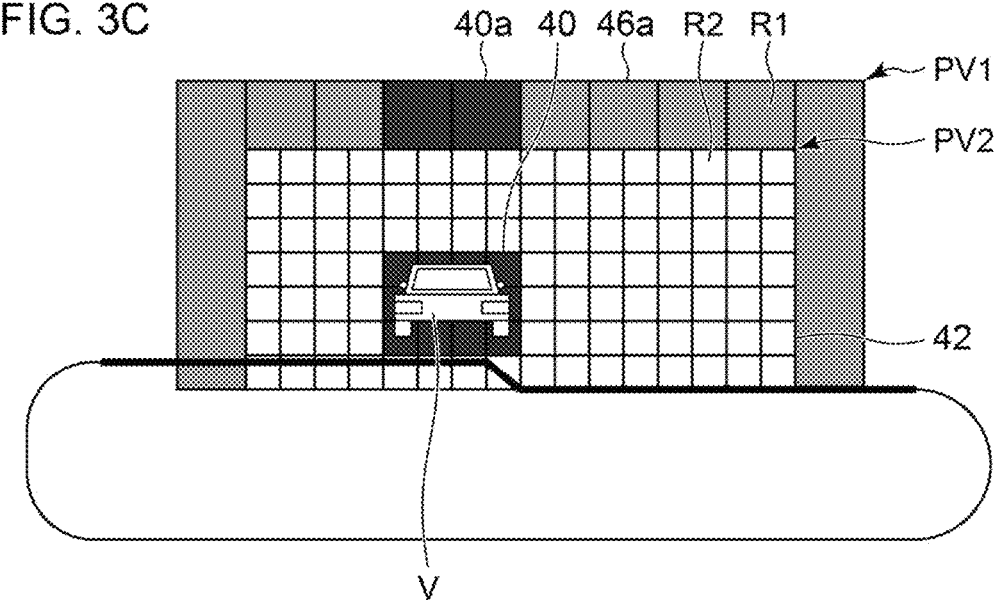

The light distribution control device 8 executes the following light distribution control in regard to a forward vehicle V among targets present ahead of the host vehicle. FIGS. 3A to 3C are schematic diagrams showing light distribution patterns that the first lamp unit 2 and the second lamp unit 4 form in regard to a forward vehicle V. FIG. 3A shows a light distribution pattern that the first lamp unit 2 forms in regard to the forward vehicle V. FIG. 3B shows a light distribution pattern that the second lamp unit 4 forms in regard to the forward vehicle V. FIG. 3C shows how the light distribution pattern that the first lamp unit 2 forms and the light distribution pattern that the second lamp unit 4 forms are combined.

Specifically, the situation determining unit 36 finds the presence and position of a forward vehicle V from an image IMG that is based on the imaging device 6. The forward vehicle V includes a leading vehicle and an oncoming vehicle. The situation determining unit 36 can find the presence and position of the forward vehicle V by subjecting the image IMG to known image processing or to a known image analysis. The situation determining unit 36 can differentiate between a leading vehicle and an oncoming vehicle based, for example, on the position of a forward vehicle V or on the difference between the red color of a tail lamp or a stop lamp and the white color of a headlamp.

Herein, the situation determining unit 36 may detect the forward vehicle V based on a measurement result of, for example, a range finding sensor (not illustrated). The range finding sensor has its measuring direction oriented to the region ahead and acquires information about the region ahead. The range finding sensor can be constituted by, for example but not limited to, a millimeter-wave radar or a LiDAR (Light Detection and Ranging or Laser Imaging Detection and Ranging). The range finding sensor can, based on the length of time from the timing at which the range finding sensor has emitted a millimeter wave or light toward the region ahead to the timing of detection of the reflected wave or the reflected light, acquire the presence of the target associated with the reflected wave or the reflected light as well as the distance to that target. Furthermore, the range finding sensor can acquire information about the movement of the target by accumulating such distance data with each distance data linked to the detection position of the target. Alternatively, the light distribution control device 8 may acquire information concerning the forward vehicle V from a vehicle ECU. In this case, the vehicle ECU functions as the situation determining unit 36.

Upon the forward vehicle V being detected, the pattern determining unit 38 sets, within a first light distribution variable pattern PV1, a shading pattern 40*a* that overlaps the forward vehicle V, as shown in FIG. 3A. The pattern determining unit 38 can set the shading pattern 40*a* by reducing the illuminance of a partial region R1 overlapping at least the forward vehicle V to an illuminance lower than the illuminance of a partial region R1 in which the forward vehicle V is not present. Furthermore, the pattern determining unit 38 sets, within a second light distribution variable pattern PV2, a shading pattern 40*b* that overlaps the forward vehicle V, as shown in FIG. 3B. The pattern determining unit 38 can set the shading pattern 40*b* by reducing the illuminance of a partial region R2 overlapping at least the forward vehicle V to an illuminance lower than the illuminance of a partial region R2 in which the forward vehicle V is not present.

The pattern determining unit 38 then controls the first lamp unit 2 so as to form the first light distribution variable pattern PV1 that includes the shading pattern 40*a* and controls the second lamp unit 4 so as to form the second light distribution variable pattern PV2 that includes the shading pattern 40*b*. Thus, the shading pattern 40*a* and the shading pattern 40*b* become superposed on each other, as shown in FIG. 3C, and a combined shading pattern 40 is formed in regard to the forward vehicle V. Herein, the combined shading pattern 40 may be formed also in a region adjacent to the region overlapping the forward vehicle V.

The shading patterns 40*a* and 40*b* are patterns that are not dependent on the luminance of an image IMG and that each have an illuminance lower than the illuminance of predetermined high-illuminance patterns 42*a* and 42*b* that the respective lamp units form in a region where no target is present. The combined shading pattern 40 has an illuminance that is the sum total of the illuminance of the shading pattern 40*a* and the illuminance of the shading pattern 40*b*. Forming the combined shading pattern 40 in regard to the forward vehicle V can reduce glare caused on the driver of the forward vehicle V and can also improve the visibility of the driver of the host vehicle.

According to the present embodiment, the illuminance of the shading patterns 40*a* and 40*b* and of the combined shading pattern 40 is substantially zero. Herein, the illuminance of the shading patterns 40*a* and 40*b* and of the combined shading pattern 40 may be higher than zero. For example, the luminous intensity of light that forms the shading patterns 40*a* and 40*b* is no higher than 625 cd. Meanwhile, the luminous intensity of light that forms the combined shading pattern 40 is preferably no higher than 625 cd. The illuminance of these patterns can be set as appropriate based on experiments or simulations with, for example, the degree of glare experienced by the driver of a forward vehicle V taken into consideration. The illuminance of the shading pattern 40*a* and the illuminance of the shading pattern 40*b* may differ from each other.

Meanwhile, the pattern determining unit 38 controls at least one of the first lamp unit 2 or the second lamp unit 4 so as to form predetermined high-illuminance patterns 42*a* and 42*b* in a region where no target is present. Then, the pattern determining unit 38 superposes the light distribution patterns that the first lamp unit 2 and the second lamp unit 4 form to form a combined high-illuminance pattern 42. The illuminance of the combined high-illuminance pattern 42 matches, for example, the illuminance of high beam light distribution patterns defined by regulations. The illuminance of the high-illuminance pattern 42*a* and the illuminance of the high-illuminance pattern 42*b* may each be set so as to yield, when added to the illuminance of another light distribution pattern superposed thereon, the illuminance required for the combined high-illuminance pattern 42, or may each be set so as to satisfy by itself the illuminance required for the combined high-illuminance pattern 42. The illuminance of the high-illuminance pattern 42*a* and the illuminance of the high-illuminance pattern 42*b* may differ from each other.

Although details will be described later, according to the present embodiment, a first illuminance fixed pattern 46*a* is set in a partial region R1 of the first light distribution variable pattern PV1 where the first light distribution variable pattern PV1 does not overlap the forward vehicle V. Furthermore, the high-illuminance pattern 42*b* is set in a partial region R2 of the second light distribution variable pattern PV2 where the second light distribution variable pattern PV2 does not overlap the forward vehicle V. The pattern determining unit 38 then controls the first lamp unit 2 so as to form the first light distribution variable pattern PV1 that includes the first illuminance fixed pattern 46*a* and controls the second lamp unit 4 so as to form the second light distribution variable pattern PV2 that includes the high-illuminance pattern 42*b*. Thus, the first illuminance fixed pattern 46*a* and the high-illuminance pattern 42*b* become superposed on each other, as shown in FIG. 3C, and a combined high-illuminance pattern 42 is formed in the region where no target is present. This combined high-illuminance pattern 42 has an illuminance that is the sum total of the illuminance of the first illuminance fixed pattern 46*a* and the illuminance of the high-illuminance pattern 42*b*.

Figure 4A:
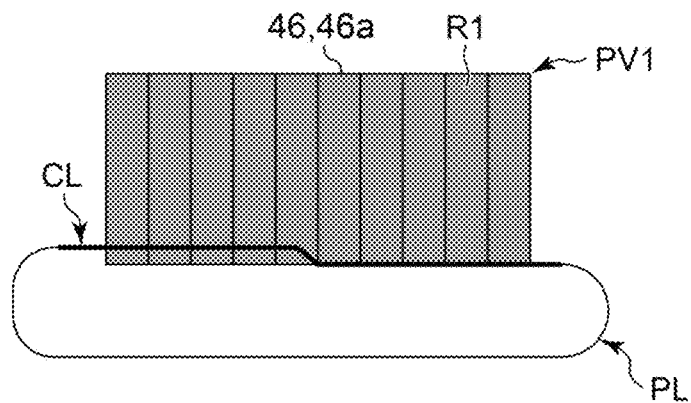
FIGS. 4A, 4B, 4C, 4D and 4E are schematic diagrams showing light distribution patterns that a first lamp unit and a second lamp unit form in a situation in which a specific target is present and in a situation in which no specific target is present.
Figure 4C:
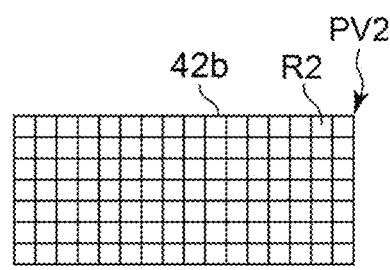
Figure 4B:
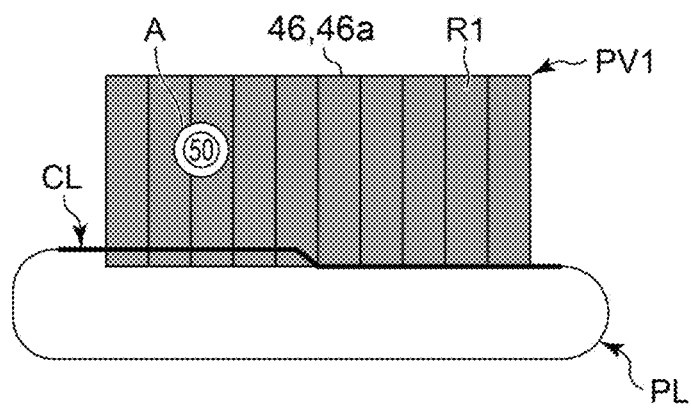
Figure 4D:
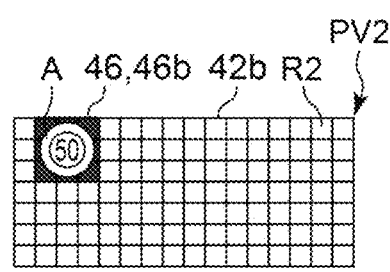
Figure 4E:
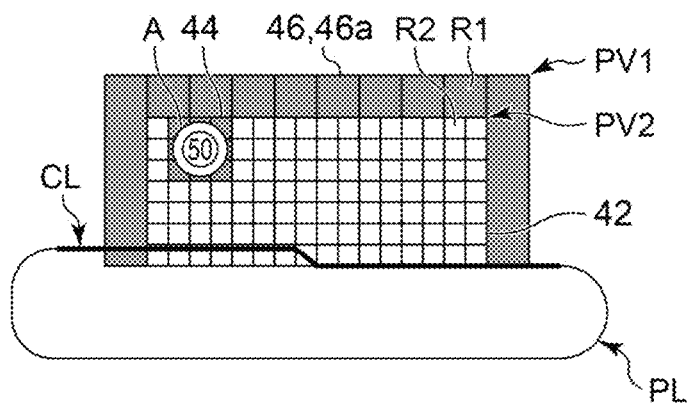

The light distribution control device 8 executes the following light distribution control in regard to a specific target A among targets present ahead of the host vehicle. FIGS. 4A to 4E are schematic diagrams showing light distribution patterns that the first lamp unit 2 and the second lamp unit 4 form in a situation in which the specific target A is present and in a situation in which the specific target A is not present. FIG. 4A shows a light distribution pattern that the first lamp unit 2 forms in a situation in which the specific target A is not present. FIG. 4B shows a light distribution pattern that the first lamp unit 2 forms in a situation in which the specific target A is present. FIG. 4C shows a light distribution pattern that the second lamp unit 4 forms in a situation in which the specific target A is not present. FIG. 4D shows a light distribution pattern that the second lamp unit 4 forms in a situation in which the specific target A is present. FIG. 4E shows how, in a situation in which the specific target A is present, the light distribution pattern that the first lamp unit 2 forms and the light distribution pattern that the second lamp unit 4 forms are combined.

Specifically, the situation determining unit 36 finds the presence and position of the specific target A from an image IMG that is based on the imaging device 6. The specific target A is a target for which a combined mid-illuminance pattern 44 is to be formed at an illuminance lower than the illuminance of a combined high-illuminance pattern 42 and higher than the illuminance of a combined shading pattern 40. Examples of the specific target A include a light reflective object. According to the present embodiment, a light reflective object is at least one selected from the group consisting of a road sign, a roadside marker (a delineator), or a signboard. Furthermore, a light reflective object is an object having a retroreflective surface in an area that is visible at least from the host vehicle. When a lamp of the host vehicle illuminates a light reflective object with light, high-luminance light may be reflected from the light reflective object to dazzle the driver. Meanwhile, since a light reflective object is not a self-luminous object, reducing the illumination on a light reflective object may reduce the driver's visibility of the light reflective object. Therefore, a light reflective object corresponds to a specific target A for which a combined mid-illuminance pattern 44 is to be formed.

The situation determining unit 36 can find the presence and position of the specific target A by subjecting an image IMG to known image processing or to a known image analysis. For example, if the specific target A is a light reflective object, the situation determining unit 36, holding feature points indicating light reflective objects in advance, can recognize the presence and position of the light reflective object by determining that feature points indicating the light reflective object are present in the region within the image IMG where the light reflective object is estimated to be present.

Alternatively, the situation determining unit 36 can detect a light reflective object based on a change in the luminance observed between when the light reflective object is illuminated with light from the first lamp unit 2 and/or the second lamp unit 4 and when the light reflective object is not illuminated with light from the first lamp unit 2 and/or the second lamp unit 4. In other words, since a light reflective object is not a self-luminous object, the luminance of a light reflective object changes greatly by the presence of illumination of light from a lamp unit. Thus, the pattern determining unit 38 controls the lamp units so as to switch between illumination and non-illumination of light in each individual region R. This switching is preferably executed at such a rate that the driver does not recognize the switching and repeated periodically at predetermined intervals. The situation determining unit 36 can detect a light reflective object based on a change, observed at switching, in the luminance value of each pixel in the image IMG. Herein, the situation determining unit 36 may detect the specific target A based on a measurement result of, for example, a range finding sensor (not illustrated). Alternatively, the light distribution control device 8 may acquire information concerning the specific target A from a vehicle ECU.

The pattern determining unit 38 according to the present embodiment controls the first lamp unit 2 and the second lamp unit 4 so as to form illuminance fixed patterns 46 in regard to the specific target A. Each illuminance fixed pattern 46 is a pattern that is not dependent on the luminance of an image IMG. Thus, the illuminance fixed patterns 46 that the first lamp unit 2 and the second lamp unit 4 form become superposed on each other to form a combined mid-illuminance pattern 44 in regard to the specific target A.

To be more specific, the pattern determining unit 38 sets, in a first light distribution variable pattern PV1, a first illuminance fixed pattern 46a that overlaps the specific target A. The first illuminance fixed pattern 46a is a pattern having an illuminance lower than the illuminance of a high-illuminance pattern 42a and higher than the illuminance of a shading pattern 40a. The pattern determining unit 38 according to the present embodiment controls the first lamp unit 2 so as to form the first illuminance fixed pattern 46a irrespective of the presence or absence of the specific target A. For example, in a situation in which the specific target A is not present, the pattern determining unit 38 sets the entirety of the first light distribution variable pattern PV1 to the first illuminance fixed pattern 46a, as shown in FIG. 4A. Thus, when the specific target A appears ahead of the host vehicle, as shown in FIG. 4B, the first illuminance fixed pattern 46a is set naturally in regard to this specific target A. Herein, the pattern includes a shading pattern 40a if a forward vehicle V is present.

Meanwhile, the pattern determining unit 38 controls the second lamp unit 4 so as to form a high-illuminance pattern 42b when the specific target A is detected. For example, in a situation in which the specific target A is not present, the pattern determining unit 38 sets the entirety of the second light distribution variable pattern PV2 to the high-illuminance pattern 42b, as shown in FIG. 4C. Herein, the pattern includes a shading pattern 40b if a forward vehicle V is present. Upon the specific target A being detected, the pattern determining unit 38 sets, within the second light distribution variable pattern PV2, a second illuminance fixed pattern 46b that overlaps the specific target A, as shown in FIG. 4D. The second illuminance fixed pattern 46b is a pattern having an illuminance lower than the illuminance of the first illuminance fixed pattern 46a. In one example, the illuminance of the second illuminance fixed pattern 46b is the same as the illuminance of a shading pattern 40b, that is, is zero.

The pattern determining unit 38 then controls the first lamp unit 2 so as to form the first light distribution variable pattern PV1 that includes the first illuminance fixed pattern 46a and controls the second lamp unit 4 so as to form the second light distribution variable pattern PV2 that includes the second illuminance fixed pattern 46b. Thus, the first illuminance fixed pattern 46a and the second illuminance fixed pattern 46b become superposed on each other, as shown in FIG. 4E, and the combined mid-illuminance pattern 44 is formed in regard to the specific target A.

The combined mid-illuminance pattern 44 has an illuminance that is the sum total of the illuminance of the first illuminance fixed pattern 46a and the illuminance of the second illuminance fixed pattern 46b. According to the present embodiment, since the illuminance of the second illuminance fixed pattern 46b is zero, the illuminance of the combined mid-illuminance pattern 44 is equal to the illuminance of the first illuminance fixed pattern 46a. Herein, the illuminance may be uniform throughout the combined mid-illuminance pattern 44, or the combined mid-illuminance pattern 44 may have a non-uniform illuminance distribution in which the illuminance gradually increases from the center portion to the peripheral portion. In the region where the specific target A is not present, the first illuminance fixed pattern 46a and the high-illuminance pattern 42b are superposed on each other to form a combined high-illuminance pattern 42. Herein, the combined mid-illuminance pattern 44 may be formed also in a region adjacent to the region that overlaps the specific target A.

Figure 5:
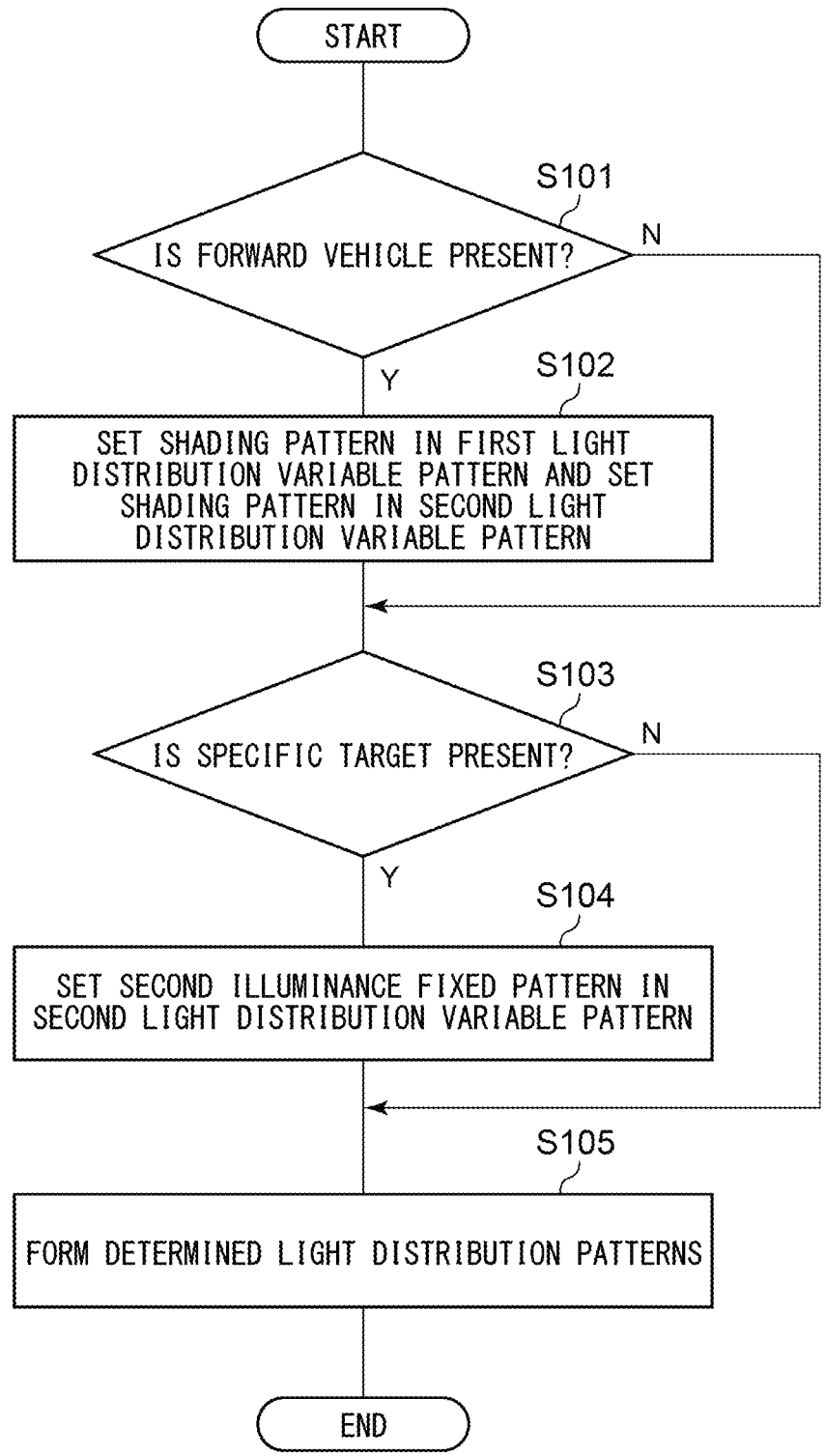
FIG. 5 is a flowchart showing one example of light distribution control according to Embodiment 1.

FIG. 5 is a flowchart showing one example of light distribution control according to Embodiment 1. This flow is executed repeatedly at predetermined timings, for example, when the execution of the light distribution control is instructed via a light switch (not illustrated) and when the ignition is on. In the light distribution control according to the present embodiment, a first light distribution variable pattern PV1 the entirety of which is a first illuminance fixed pattern 46a and a second light distribution variable pattern PV2 the entirety of which is a high-illuminance pattern 42b are formed in a steady state.

The light distribution control device 8 determines whether a forward vehicle V is included in an image IMG that is based on the imaging device 6 (S101). If a forward vehicle V is included (Y at S101), the light distribution control device 8 sets a shading pattern 40a in the first light distribution variable pattern PV1 and sets a shading pattern 40b in the second light distribution variable pattern PV2 (S102). The light distribution control device 8 then determines whether a specific target A is included in the image IMG (S103). If no forward vehicle V is included (N at S101), the process proceeds to step S103, skipping step S102.

If a specific target A is included (Y at S103), the light distribution control device 8 sets a second illuminance fixed pattern 46b in the second light distribution variable pattern PV2 (S104). The light distribution control device 8 then controls the first lamp unit 2 and the second lamp unit 4 so as to form the determined light distribution patterns (S105) and terminates this routine. If no specific target A is included (N at S103), the process proceeds to step S105, skipping step S104.

As described thus far, the vehicular lamp system 1 according to the present embodiment includes the first lamp unit 2 capable of forming a first light distribution variable pattern PV1, the second lamp unit 4 capable of forming a second light distribution variable pattern PV2, and the light distribution control device 8 that controls formation of the first light distribution variable pattern PV1 by the first lamp unit 2 and formation of the second light distribution variable pattern PV2 by the second lamp unit 4 in accordance with a target included in an image IMG that is based on the imaging device 6.

The light distribution control device 8 controls at least one of the first lamp unit 2 or the second lamp unit 4 so as to form high-illuminance patterns 42a and 42b at a predetermined illuminance in a region where no target is present, and forms a combined high-illuminance pattern 42 by superposing the light distribution patterns that the first lamp unit 2 and the second lamp unit 4 form. Furthermore, in regard to a forward vehicle V among targets, the light distribution control device 8 controls the first lamp unit 2 and the second lamp unit 4 so as to form shading patterns 40a and 40b that are not dependent on the luminance of the image IMG at an illuminance lower than the illuminance of the high-illuminance patterns 42a and 42b, and forms a combined shading pattern 40 by superposing the shading patterns 40a and 40b that the first lamp unit 2 and the second lamp unit 4 form.

Furthermore, in regard to a specific target A, among targets, for which a combined mid-illuminance pattern 44 is to be formed at an illuminance lower than the illuminance of the combined high-illuminance pattern 42 and higher than the illuminance of the combined shading pattern 40, the light distribution control device 8 controls the first lamp unit 2 and the second lamp unit 4 so as to form illuminance fixed patterns 46 that are not dependent on the luminance of the image IMG and forms the combined mid-illuminance pattern 44 by superposing the illuminance fixed patterns 46 that the first lamp unit 2 and the second lamp unit 4 form.

Examples of the specific target A include a light reflective object that is not a self-luminous object and that may reflect back high-luminance light. Forming the combined mid-illuminance pattern 44 in regard to such a light reflective object can reduce glare caused by the light reflective object while maintaining the visibility of the light reflective object. Accordingly, the visibility of the driver of the host vehicle on the region ahead can be increased.

Meanwhile, research and development are ongoing in recent years in advanced driver-assistance systems (ADAS) or automatic driving technologies as emerging technologies for assisting drivers in their driving operations. In ADAS or automatic driving technologies, the situation ahead of the host vehicle is grasped by use of an imaging device, such as a camera, serving as machine vision, and vehicle control suitable for that situation is executed. When high-luminance light is reflected from a light reflective object, white-clipping may occur in an image that the imaging device generates, which may hinder grasping the situation. Yet, reducing the illumination of light on the light reflective object makes it harder to detect the light reflective object by the imaging device. Therefore, the light distribution control according to the present embodiment is useful also in improving the accuracy of ADAS or automatic driving technologies.

Furthermore, according to the present embodiment, the first lamp unit 2 and the second lamp unit 4 each form an illuminance fixed pattern 46, and the two illuminance fixed patterns 46 are superposed on each other to form a combined mid-illuminance pattern 44. Thus, the light distribution control can be simplified, as compared with a case in which a combined mid-illuminance pattern 44 is formed by executing so-called feedback control, that is, by adjusting, in each lamp unit, the illuminance of a light distribution pattern to bring the luminance of a specific target A in an image IMG closer to a target luminance. As a result, the light distribution control can be accelerated and stabilized, and the load on the light distribution control device 8 can be reduced.

Furthermore, in regard to a specific target A, the light distribution control device 8 according to the present embodiment controls the first lamp unit 2 so as to form a first illuminance fixed pattern 46a at an illuminance lower than the illuminance of the high-illuminance pattern 42a and higher than the illuminance of the shading pattern 40a. Furthermore, the light distribution control device 8 controls the second lamp unit 4 so as to form a second illuminance fixed pattern 46b at an illuminance lower than the illuminance of the first illuminance fixed pattern 46a. Thus, a combined mid-illuminance pattern 44 can be formed with simple light distribution control.

Moreover, the light distribution control device 8 according to the present embodiment controls the first lamp unit 2 so as to form a first illuminance fixed pattern 46a irrespective of the presence or absence of a specific target A. Furthermore, the light distribution control device 8 controls the second lamp unit 4 so as to form a high-illuminance pattern 42b when no specific target A is detected and to form a second illuminance fixed pattern 46b when a specific target A is detected. In other words, a first illuminance fixed pattern 46a and a high-illuminance pattern 42b are superposed on each other to form a combined high-illuminance pattern 42 when no specific target A is present, and a high-illuminance pattern 42b alone that the second lamp unit 4 forms is switched to a second illuminance fixed pattern 46b to form a combined mid-illuminance pattern 44 upon a specific target A appearing. Thus, the light distribution control can be further simplified, and the stability of the light distribution control can be increased.

Furthermore, according to the present embodiment, the first lamp unit 2 and the second lamp unit 4 are disposed inside the lamp room 14, and the imaging device 6 is disposed outside the lamp room 14. Disposing the imaging device 6 outside the lamp room 14 increases the need for a process of correcting parallax between the imaging device 6 and the first lamp unit 2 and second lamp unit 4. Furthermore, disposing the light distribution control device 8 inside the lamp room 14 increases the communication time between the imaging device 6 and the light distribution control device 8. Therefore, the speed of the light distribution control that the light distribution control device 8 executes is likely to decrease. Any effort to maintain the control speed increases the load on the light distribution control device 8.

Furthermore, the second lamp unit 4 has a higher resolving power than the first lamp unit 2, and thus, although the second lamp unit 4 can form a light distribution pattern with a higher accuracy, the second lamp unit 4 exerts a greater load on the light distribution control device 8 during control than the first lamp unit 2 does. Moreover, as compared with the switching to an illuminance fixed pattern 46, feedback control exerts a greater load on the light distribution control device 8. Even if the parallax correction mentioned above is performed in the meantime, the position information obtained of a target is likely to have a lower accuracy than it would when the imaging device 6 is disposed inside the lamp room 14.

Even if the feedback control is executed in the second lamp unit 4 having a higher resolving power, its benefit is limited if the accuracy of the position information of a target is low, and the load may be exerted on the light distribution control device 8 in vain. Therefore, when the imaging device 6 is disposed outside the lamp room 14, it is preferable that a second illuminance fixed pattern 46b be formed by the second lamp unit 4, as in the present embodiment. Thus, any unnecessary load can be kept from being exerted on the light distribution control device 8.

Embodiment 2

Figure 6:
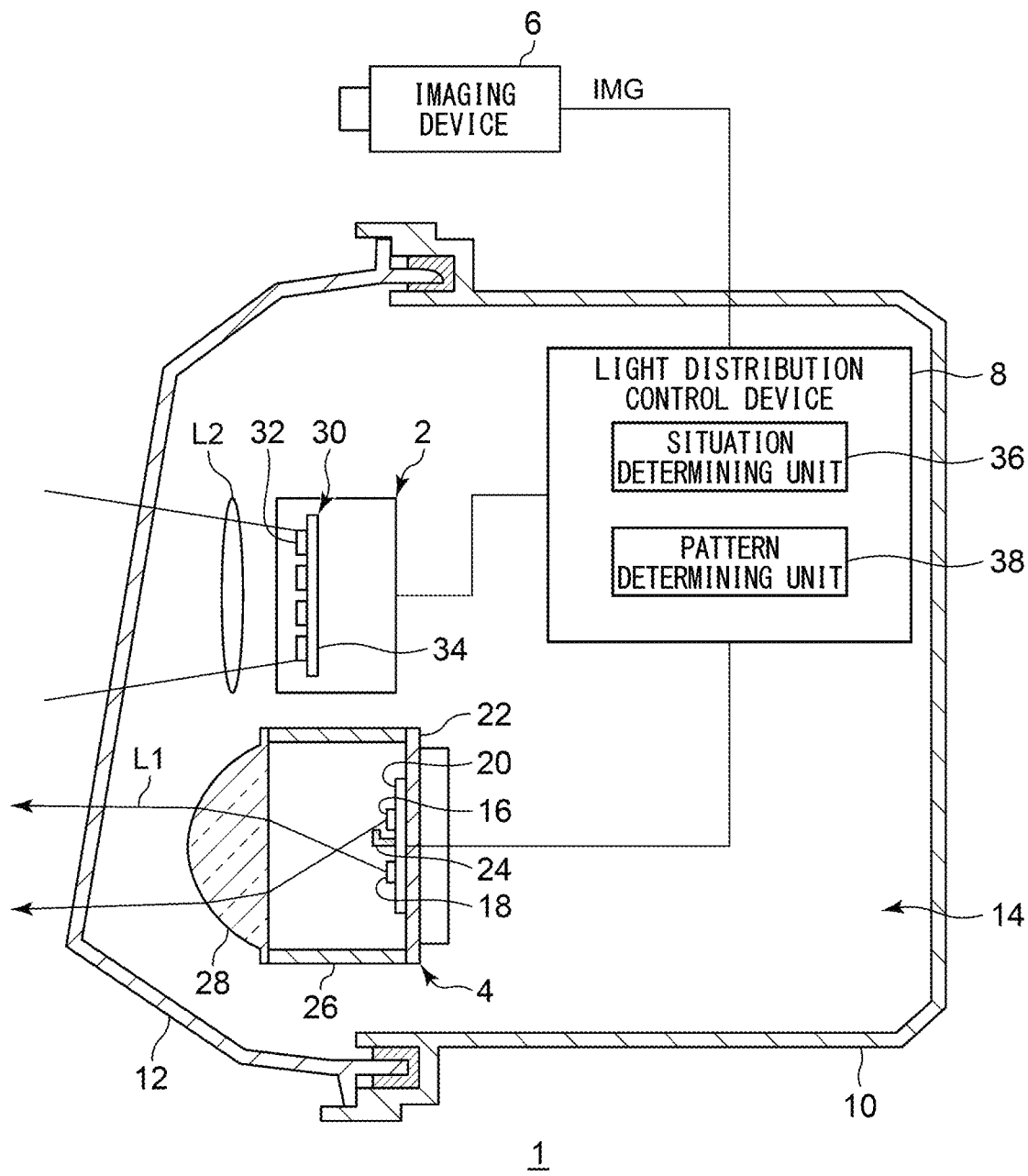
FIG. 6 shows a schematic configuration of a vehicular lamp system according to Embodiment 2.

Embodiment 2 has a configuration that is common to the configuration of Embodiment 1, except in the structure of a first lamp unit 2 and of a second lamp unit 4 and in the contents of control by a light distribution control device 8. The present embodiment will be described below with the description centered on its configuration that differs from the configuration of Embodiment 1, and description of configurations that are common to both embodiments will be simplified or omitted. FIG. 6 shows a schematic configuration of a vehicular lamp system 1 according to Embodiment 2. As with FIG. 1, FIG. 6 depicts some of the constituent elements of the vehicular lamp system 1 in the form of functional blocks.

The vehicular lamp system 1 according to the present embodiment includes a first lamp unit 2, a second lamp unit 4, an imaging device 6, and a light distribution control device 8. The first lamp unit 2, the second lamp unit 4, and the light distribution control device 8 are disposed inside a lamp room 14. The imaging device 6 is disposed outside the lamp room 14, for example, in the vehicle.

The first lamp unit 2 has a structure the same as the structure of the second lamp unit 4 according to Embodiment 1. Specifically, the first lamp unit 2 includes a light source array 30. The first lamp unit 2 can form a first light distribution variable pattern PV1 formed by a set of partial regions R1 arrayed in a matrix, by projecting a visible light beam L2 from the light source array 30. The first lamp unit 2 has a higher resolving power than the second lamp unit 4.

The second lamp unit 4 has a structure the same as the structure of the first lamp unit 2 according to Embodiment 1. Specifically, the second lamp unit 4 includes a first light source group 16, a second light source group 18, a circuit board 20, a heat sink 22, a shade member 24, a lens holder 26, and a projection lens 28. The second lamp unit 4 can form a low beam light distribution pattern PL by projecting light from the first light source group 16. Furthermore, the second lamp unit 4 can form a second light distribution variable pattern PV2 formed by a set of partial regions R2 arrayed in the horizontal direction, by projecting a visible light beam L1 from the second light source group 18.

The light distribution control device 8 controls formation of light distribution patterns by the first lamp unit 2 and the second lamp unit 4 in accordance with a target included in an image IMG that is based on the imaging device 6. The light distribution control device 8 includes a situation determining unit 36 and a pattern determining unit 38.

The light distribution control device 8 forms a combined shading pattern 40 in regard to a forward vehicle V. Specifically, the pattern determining unit 38 sets, in a first light distribution variable pattern PV1, a shading pattern 40a that overlaps a forward vehicle V. Furthermore, the pattern determining unit 38 sets, in a second light distribution variable pattern PV2, a shading pattern 40b that overlaps the forward vehicle V. The pattern determining unit 38 then controls the first lamp unit 2 so as to form the first light distribution variable pattern PV1 that includes the shading pattern 40a and controls the second lamp unit 4 so as to form the second light distribution variable pattern PV2 that includes the shading pattern 40b. Thus, the shading pattern 40a and the shading pattern 40b become superposed on each other to form a combined shading pattern 40 in regard to the forward vehicle V.

Meanwhile, the pattern determining unit 38 forms a combined high-illuminance pattern 42 in a region where no target is present. Specifically, the pattern determining unit 38 sets, in a first light distribution variable pattern PV1, a high-illuminance pattern 42a that overlaps a region where no target is present. Furthermore, the pattern determining unit 38 sets, in a second light distribution variable pattern PV2, a high-illuminance pattern 42b that overlaps the region where no target is present. The pattern determining unit 38 then controls the first lamp unit 2 so as to form the first light distribution variable pattern PV1 that includes the high-illuminance pattern 42a and controls the second lamp unit 4 so as to form the second light distribution variable pattern PV2 that includes the high-illuminance pattern 42b. Thus, the high-illuminance pattern 42a and the high-illuminance pattern 42b become superposed on each other to form a combined high-illuminance pattern 42 in the region where no target is present.

Figure 7A:
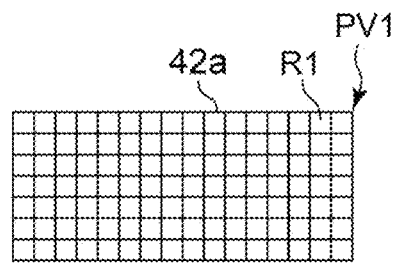
FIGS. 7A, 7B, 7C, 7D and 7E are schematic diagrams showing light distribution patterns that a first lamp unit and a second lamp unit form in a situation in which a specific target is present and in a situation in which no specific target is present.
Figure 7C:
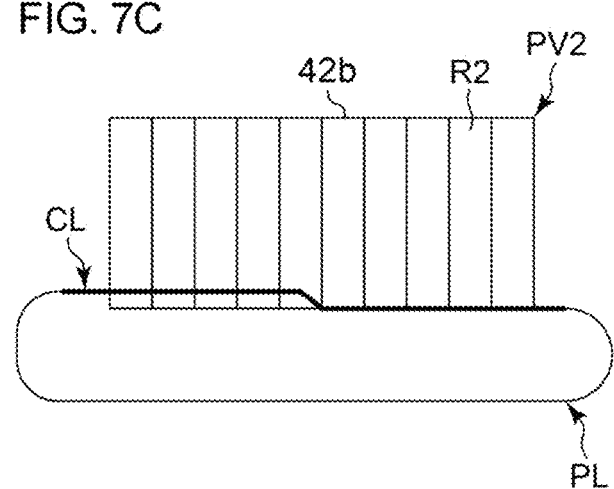
Figure 7B:
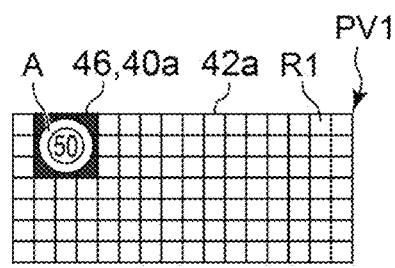
Figure 7D:
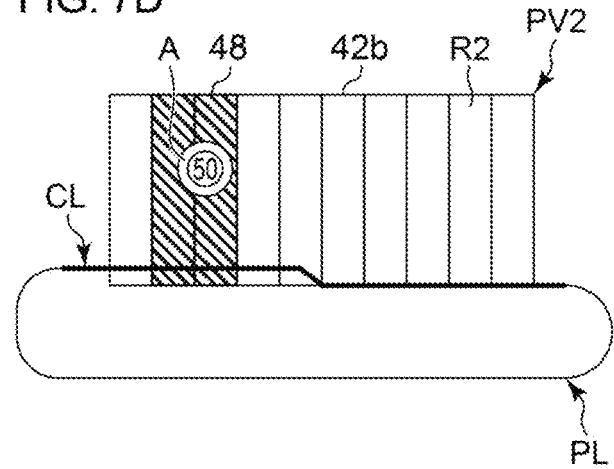
Figure 7E:
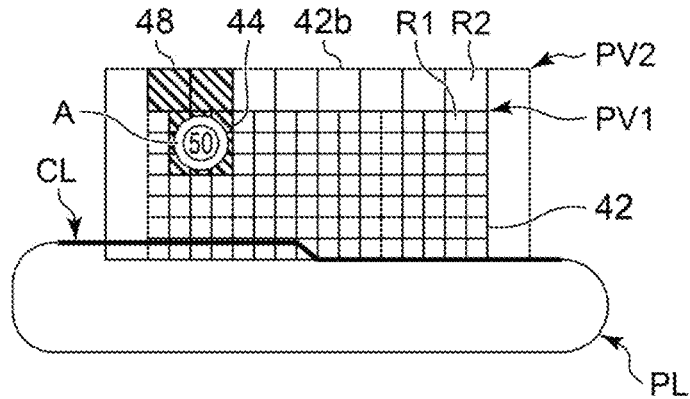

The light distribution control device 8 executes the following light distribution control in regard to a specific target A among targets present ahead of the host vehicle. FIGS. 7A to 7E are schematic diagrams showing light distribution patterns that the first lamp unit 2 and the second lamp unit 4 form in a situation in which the specific target A is present and in a situation in which the specific target A is not present. FIG. 7A shows a light distribution pattern that the first lamp unit 2 forms in a situation in which the specific target A is not present. FIG. 7B shows a light distribution pattern that the first lamp unit 2 forms in a situation in which the specific target A is present. FIG. 7C shows a light distribution pattern that the second lamp unit 4 forms in a situation in which the specific target A is not present. FIG. 7D shows a light distribution pattern that the second lamp unit 4 forms in a situation in which the specific target A is present. FIG. 7E shows how, in a situation in which the specific target A is present, the light distribution pattern that the first lamp unit 2 forms and the light distribution pattern that the second lamp unit 4 forms are combined.

The pattern determining unit 38 according to the present embodiment controls the first lamp unit 2 so as to form an illuminance fixed pattern 46 in regard to the specific target A. Furthermore, the pattern determining unit 38 controls the second lamp unit 4 so as to form an illuminance adjusted pattern 48 in regard to the specific target A. The illuminance adjusted pattern 48 is a pattern of which the illuminance is adjusted to bring the luminance (the pixel value) of the specific target A in an image IMG closer to a target luminance. Thus, the illuminance fixed pattern 46 and the illuminance adjusted pattern 48 become superposed on each other to form a combined mid-illuminance pattern 44 in regard to the specific target A.

Specifically, the pattern determining unit 38 controls the first lamp unit 2 so as to form a high-illuminance pattern 42a when the specific target A is not detected. For example, in a situation in which the specific target A is not present, the pattern determining unit 38 sets the entirety of a first light distribution variable pattern PV1 to the high-illuminance pattern 42a, as shown in FIG. 7A. Herein, the pattern includes a shading pattern 40a if a forward vehicle V is present. Upon the specific target A being detected, the pattern determining unit 38 sets, within the first light distribution variable pattern PV1, a shading pattern 40a that overlaps the specific target A, as shown in FIG. 7B. This shading pattern 40a corresponds to the illuminance fixed pattern 46.

Meanwhile, the pattern determining unit 38 controls the second lamp unit 4 so as to form a high-illuminance pattern 42b when the specific target A is not detected. For example, in a situation in which the specific target A is not present, the pattern determining unit 38 sets the entirety of a second light distribution variable pattern PV2 to the high-illuminance pattern 42b, as shown in FIG. 7C. Herein, the pattern includes a shading pattern 40b if a forward vehicle V is present. Upon the specific target A being detected, the pattern determining unit 38 sets, within the second light distribution variable pattern PV2, an illuminance adjusted pattern 48 that overlaps the specific target A, as shown in FIG. 7D.

For example, the pattern determining unit 38 has pre-stored in a memory thereof information concerning a target luminance. The target luminance is such a luminance that reduces glare caused on the driver by reflected light from the specific target A and that still allows the driver to see the specific target A, and can be set as appropriate based on experiments or simulations. Based on the stored target luminance and the luminance of a partial region R2 that overlaps the specific target A in the image IMG, the pattern determining unit 38 executes feedback control of determining the illuminance of the illuminance adjusted pattern 48 to be formed next.

The pattern determining unit 38 then controls the first lamp unit 2 so as to form the first light distribution variable pattern PV1 that includes the shading pattern 40a and controls the second lamp unit 4 so as to form the second light distribution variable pattern PV2 that includes the illuminance adjusted pattern 48. Thus, the shading pattern 40a and the illuminance adjusted pattern 48 become superposed on each other, as shown in FIG. 7E, and a combined mid-illuminance pattern 44 is formed in regard to the specific target A. The combined mid-illuminance pattern 44 has an illuminance that is the sum total of the illuminance of the shading pattern 40a and the illuminance of the illuminance adjusted pattern 48. According to the present embodiment, since the illuminance of the shading pattern 40a is zero, the illuminance of the combined mid-illuminance pattern 44 is equal to the illuminance of the illuminance adjusted pattern 48. Herein, the pattern determining unit 38 may control the first lamp unit 2 so as to form a first illuminance fixed pattern 46a in regard to the specific target A.

Figure 8:
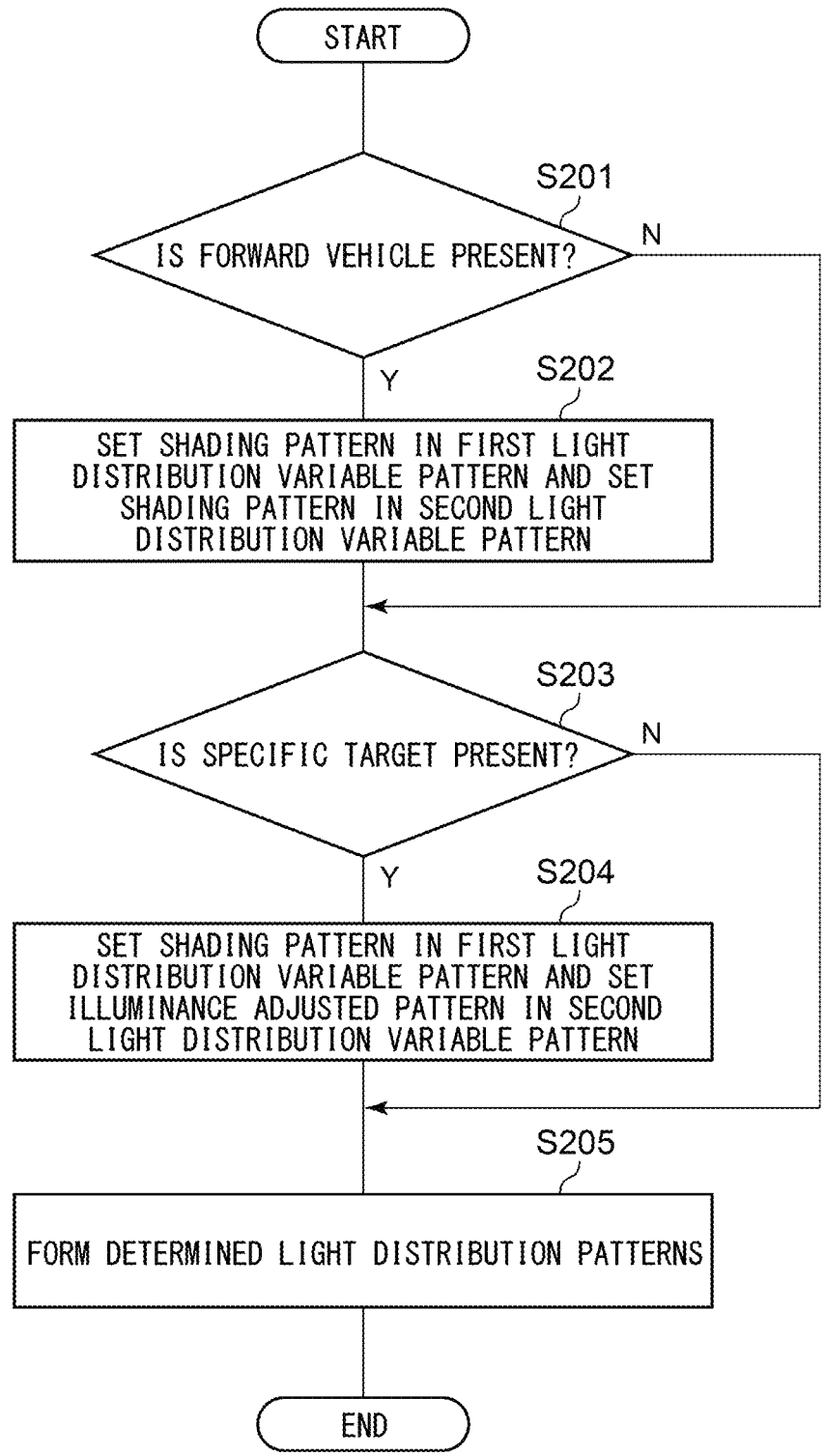
FIG. 8 is a flowchart showing one example of light distribution control according to Embodiment 2.

FIG. 8 is a flowchart showing one example of light distribution control according to Embodiment 2. In the light distribution control according to the present embodiment, a first light distribution variable pattern PV1 the entirety of which is a first illuminance fixed pattern 46a and a second light distribution variable pattern PV2 the entirety of which is a high-illuminance pattern 42b are formed in a steady state.

The light distribution control device 8 determines whether a forward vehicle V is included in an image IMG that is based on the imaging device 6 (S201). If a forward vehicle V is included (Y at S201), the light distribution control device 8 sets a shading pattern 40a in the first light distribution variable pattern PV1 and sets a shading pattern 40b in the second light distribution variable pattern PV2 (S202). The light distribution control device 8 then determines whether a specific target A is included in the image IMG (S203). If no forward vehicle V is included (N at S201), the process proceeds to step S203, skipping step S202.

If a specific target A is included (Y at S203), the light distribution control device 8 sets a shading pattern 40a in the first light distribution variable pattern PV1 and sets an illuminance adjusted pattern 48 in the second light distribution variable pattern PV2 (S204). The light distribution control device 8 then controls the first lamp unit 2 and the second lamp unit 4 so as to form the determined light distribution patterns (S205) and terminates this routine. If no specific target A is included (N at S203), the process proceeds to step S205, skipping step S204.

With the vehicular lamp system 1 according to the present embodiment described thus far as well, as with Embodiment 1, the visibility of the driver of the host vehicle can be increased. Furthermore, according to the present embodiment, the first lamp unit 2 forms an illuminance fixed pattern 46, the second lamp unit 4 forms an illuminance adjusted pattern 48, and these two light distribution patterns are superposed on each other to form a combined mid-illuminance pattern 44. Thus, the light distribution control can be simplified, as compared with a case in which a combined mid-illuminance pattern 44 is formed through feedback control executed in the two lamp units. As a result, the light distribution control can be accelerated and stabilized, and the load on the light distribution control device 8 can be reduced. Furthermore, forming the illuminance adjusted pattern 48 can vary the illuminance of the combined mid-illuminance pattern 44 in accordance with, for example, the difference in reflectance between light reflective objects. Thus, the visibility of the driver of the host vehicle can be further increased.

Furthermore, according to the present embodiment, the first lamp unit 2 and the second lamp unit 4 are disposed inside the lamp room 14, and the imaging device 6 is disposed outside the lamp room 14. Then, the first lamp unit 2 having a higher resolving power forms the shading pattern 40a at a fixed illuminance, and the second lamp unit 4 having a lower resolving power forms the illuminance adjusted pattern 48. Thus, any unnecessary load can be kept from being exerted on the light distribution control device 8.

Embodiment 3

Figure 9:
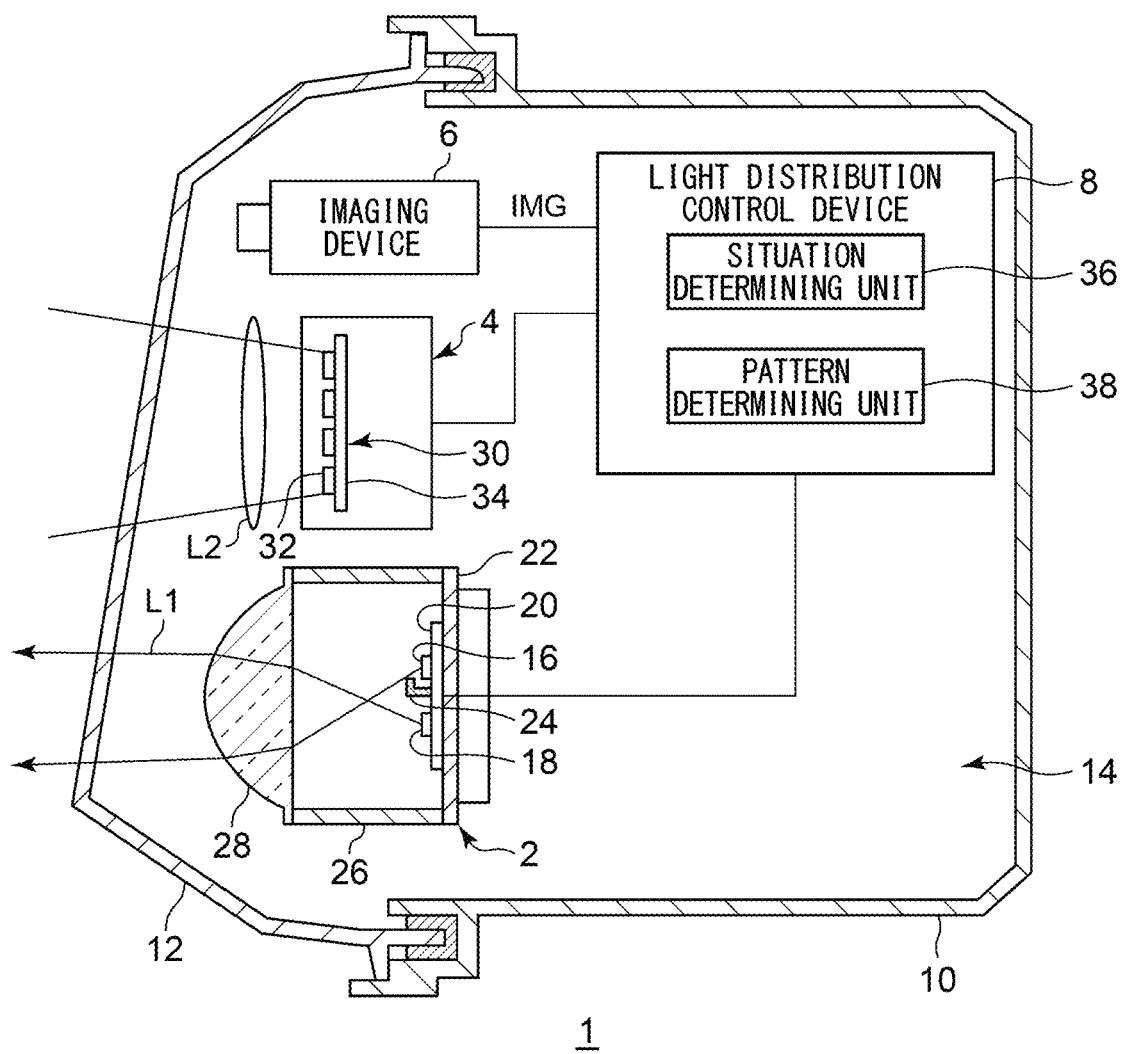
FIG. 9 shows a schematic configuration of a vehicular lamp system according to Embodiment 3.

Embodiment 3 has a configuration common to the configuration of Embodiment 1 except in the placement of an imaging device 6 and in the contents of control by a light distribution control device 8. The present embodiment will be described below with the description centered on its configuration that differs from the configuration of Embodiment 1, and description of configurations that are common to both embodiments will be simplified or omitted. FIG. 9 shows a schematic configuration of a vehicular lamp system 1 according to Embodiment 3. As with FIG. 1, FIG. 9 depicts some of the constituent elements of the vehicular lamp system 1 in the form of functional blocks.

The vehicular lamp system 1 according to the present embodiment includes a first lamp unit 2, a second lamp unit 4, an imaging device 6, and a light distribution control device 8. The first lamp unit 2, the second lamp unit 4, the imaging device 6, and the light distribution control device 8 are disposed inside a lamp room 14.

The first lamp unit 2 has a structure the same as the structure of the first lamp unit 2 according to Embodiment 1. Specifically, the first lamp unit 2 includes a first light source group 16, a second light source group 18, a circuit board 20, a heat sink 22, a shade member 24, a lens holder 26, and a projection lens 28. The first lamp unit 2 can form a low beam light distribution pattern PL by projecting light from the first light source group 16. Furthermore, the first lamp unit 2 can form a first light distribution variable pattern PV1 formed by a set of partial regions R1 arrayed in the horizontal direction, by projecting a visible light beam L1 from the second light source group 18.

The second lamp unit 4 has a structure the same as the structure of the second lamp unit 4 according to Embodiment 1. Specifically, the second lamp unit 4 includes a light source array 30. The second lamp unit 4 can form a second light distribution variable pattern PV2 formed by a set of partial regions R2 arrayed in a matrix, by projecting light from the light source array 30. The second lamp unit 4 has a higher resolving power than the first lamp unit 2.

The light distribution control device 8 controls formation of light distribution patterns by the first lamp unit 2 and the second lamp unit 4 in accordance with a target included in an image IMG that is based on the imaging device 6. The light distribution control device 8 includes a situation determining unit 36 and a pattern determining unit 38.

The light distribution control device 8 forms a combined shading pattern 40 in regard to a forward vehicle V. Specifically, the pattern determining unit 38 sets, in a first light distribution variable pattern PV1, a shading pattern 40a that overlaps a forward vehicle V. Furthermore, the pattern determining unit 38 sets, in a second light distribution variable pattern PV2, a shading pattern 40b that overlaps the forward vehicle V. The pattern determining unit 38 then controls the first lamp unit 2 so as to form the first light distribution variable pattern PV1 that includes the shading pattern 40a and controls the second lamp unit 4 so as to form the second light distribution variable pattern PV2 that includes the shading pattern 40b. Thus, the shading pattern 40a and the shading pattern 40b become superposed on each other to form a combined shading pattern 40 in regard to the forward vehicle V.

Meanwhile, the pattern determining unit 38 forms a combined high-illuminance pattern 42 in a region where no target is present. Specifically, the pattern determining unit 38 sets, in a first light distribution variable pattern PV1, a first illuminance fixed pattern 46a that overlaps a region where no target is present. Furthermore, the pattern determining unit 38 sets, in a second light distribution variable pattern PV2, a high-illuminance pattern 42b that overlaps the region where no target is present. The pattern determining unit 38 then controls the first lamp unit 2 so as to form the first light distribution variable pattern PV1 that includes the first illuminance fixed pattern 46a and controls the second lamp unit 4 so as to form the second light distribution variable pattern PV2 that includes the high-illuminance pattern 42b. Thus, the first illuminance fixed pattern 46a and the high-illuminance pattern 42b become superposed on each other to form a combined high-illuminance pattern 42 in the region where no target is present.

Figure 10A:
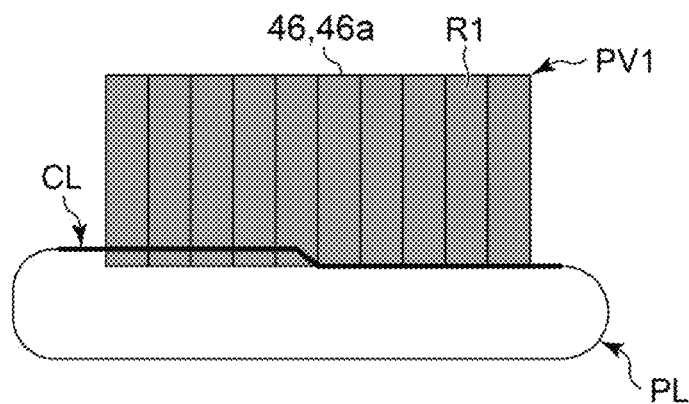
FIGS. 10A, 10B, 10C, 10D and 10E are schematic diagrams showing light distribution patterns that a first lamp unit and a second lamp unit form in a situation in which a specific target is present and in a situation in which no specific target is present.
Figure 10C:
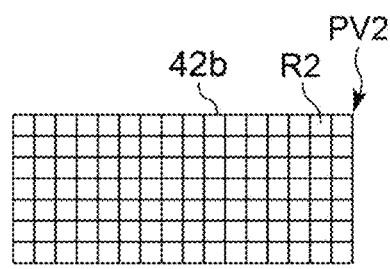
Figure 10B:
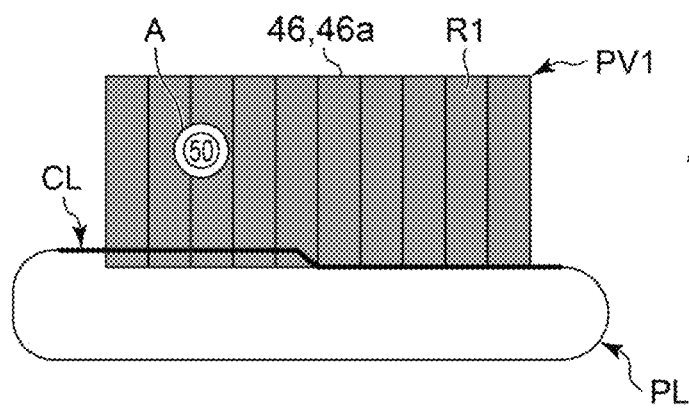
Figure 10D:
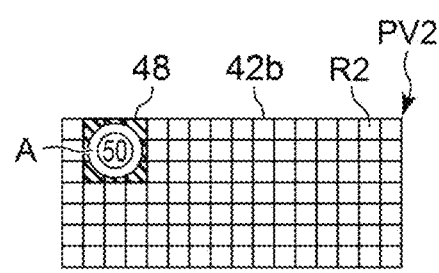
Figure 10E:
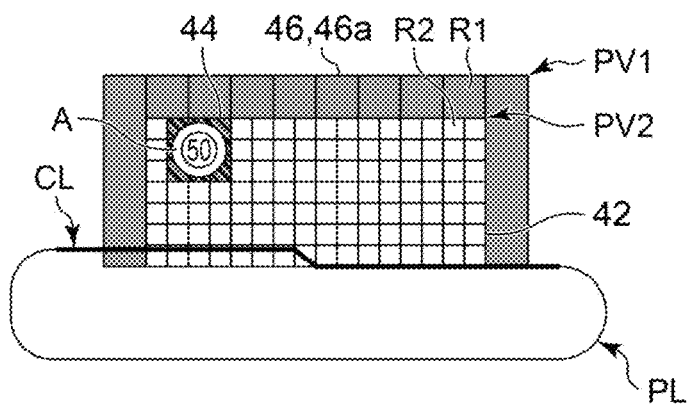

The light distribution control device 8 executes the following light distribution control in regard to a specific target A among targets present ahead of the host vehicle. FIGS. 10A to 10E are schematic diagrams showing light distribution patterns that the first lamp unit 2 and the second lamp unit 4 form in a situation in which the specific target A is present and in a situation in which the specific target A is not present. FIG. 10A shows a light distribution pattern that the first lamp unit 2 forms in a situation in which the specific target A is not present. FIG. 10B shows a light distribution pattern that the first lamp unit 2 forms in a situation in which the specific target A is present. FIG. 10C shows a light distribution pattern that the second lamp unit 4 forms in a situation in which the specific target A is not present. FIG. 10D shows a light distribution pattern that the second lamp unit 4 forms in a situation in which the specific target A is present. FIG. 10E shows how, in a situation in which the specific target A is present, the light distribution pattern that the first lamp unit 2 forms and the light distribution pattern that the second lamp unit 4 forms are combined.

The pattern determining unit 38 according to the present embodiment controls the first lamp unit 2 so as to form an illuminance fixed pattern 46 in regard to the specific target A. Furthermore, the pattern determining unit 38 controls the second lamp unit 4 so as to form an illuminance adjusted pattern 48 in regard to the specific target A. Thus, the illuminance fixed pattern 46 and the illuminance adjusted pattern 48 become superposed on each other to form a combined mid-illuminance pattern 44 in regard to the specific target A.

Specifically, the pattern determining unit 38 sets, in a first light distribution variable pattern PV1, a first illuminance fixed pattern 46a that overlaps the specific target A. The pattern determining unit 38 according to the present embodiment controls the first lamp unit 2 so as to form the first illuminance fixed pattern 46a irrespective of the presence or absence of the specific target A. For example, in a situation in which the specific target A is not present, the pattern determining unit 38 sets the entirety of the first light distribution variable pattern PV1 to the first illuminance fixed pattern 46a, as shown in FIG. 10A. Thus, when the specific target A appears ahead of the host vehicle, as shown in FIG. 10B, the first illuminance fixed pattern 46a is set naturally on this specific target A. Herein, the pattern includes a shading pattern 40a if a forward vehicle V is present.

The pattern determining unit 38 controls the second lamp unit 4 so as to form a high-illuminance pattern 42b when the specific target A is not detected. For example, in a situation in which the specific target A is not present, the pattern determining unit 38 sets the entirety of a second light distribution variable pattern PV2 to the high-illuminance pattern 42b, as shown in FIG. 10C. Herein, the pattern includes a shading pattern 40b if a forward vehicle V is present. Upon the specific target A being detected, the pattern determining unit 38 sets, within the second light distribution variable pattern PV2, an illuminance adjusted pattern 48 that overlaps the specific target A, as shown in FIG. 10D.

The pattern determining unit 38 then controls the first lamp unit 2 so as to form the first light distribution variable pattern PV1 that includes the first illuminance fixed pattern 46a and controls the second lamp unit 4 so as to form the second light distribution variable pattern PV2 that includes the illuminance adjusted pattern 48. Thus, the first illuminance fixed pattern 46a and the illuminance adjusted pattern 48 become superposed on each other, as shown in FIG. 10E, and a combined mid-illuminance pattern 44 is formed in regard to the specific target A. The combined mid-illuminance pattern 44 has an illuminance that is the sum total of the illuminance of the first illuminance fixed pattern 46a and the illuminance of the illuminance adjusted pattern 48.

Figure 11:
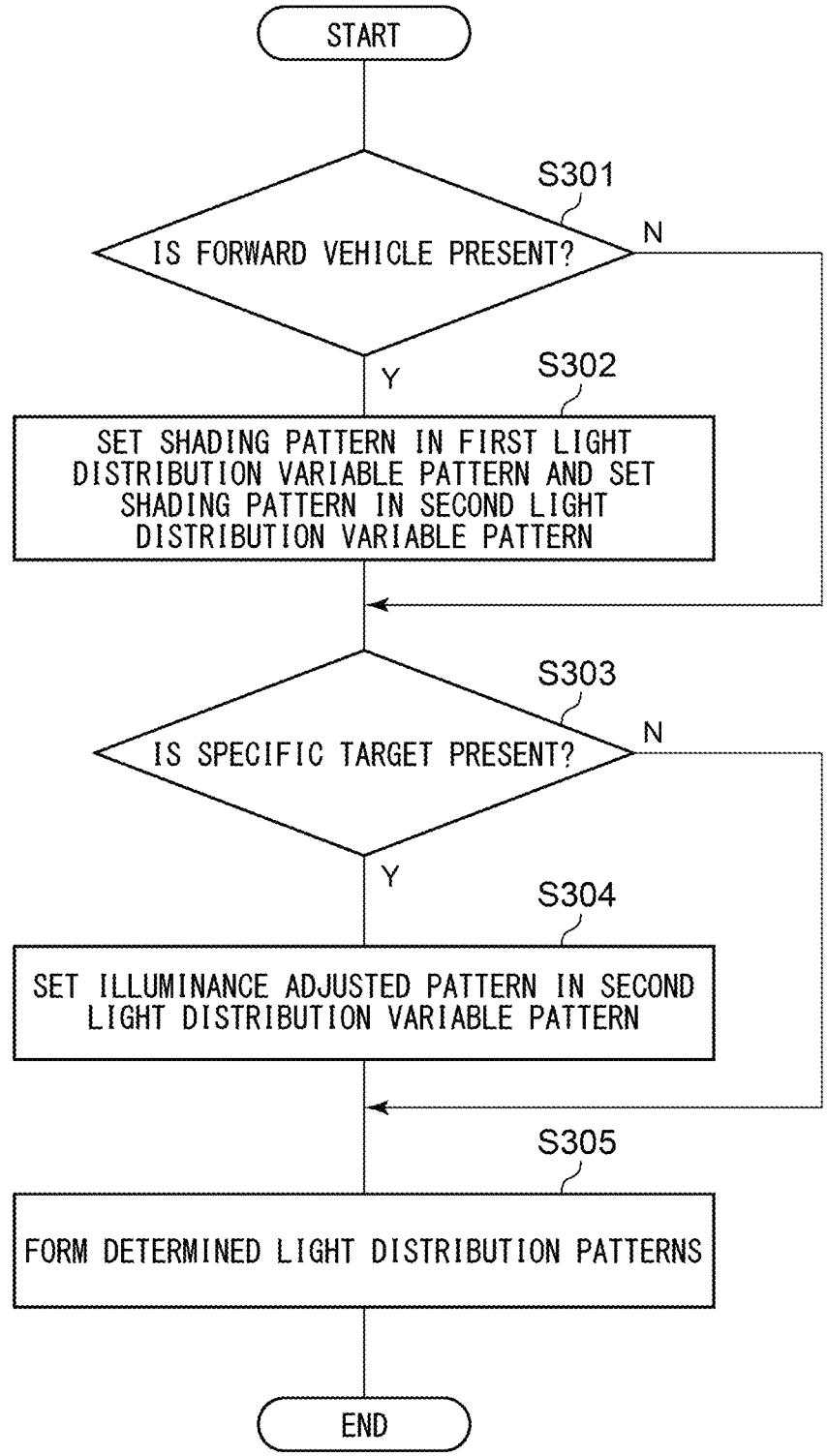
FIG. 11 is a flowchart showing one example of light distribution control according to Embodiment 3.

FIG. 11 is a flowchart showing one example of light distribution control according to Embodiment 3. In the light distribution control according to the present embodiment, a first light distribution variable pattern PV1 the entirety of which is a first illuminance fixed pattern 46a and a second light distribution variable pattern PV2 the entirety of which is a high-illuminance pattern 42b are formed in a steady state.

The light distribution control device 8 determines whether a forward vehicle V is included in an image IMG that is based on the imaging device 6 (S301). If a forward vehicle V is included (Y at S301), the light distribution control device 8 sets a shading pattern 40a in a first light distribution variable pattern PV1 and sets a shading pattern 40b in a second light distribution variable pattern PV2 (S302). The light distribution control device 8 then determines whether a specific target A is included in the image IMG (S303). If no forward vehicle V is included (N at S301), the process proceeds to step S03, skipping step S302.

If a specific target A is included (Y at S303), the light distribution control device 8 sets an illuminance adjusted pattern 48 in the second light distribution variable pattern PV2 (S304). The light distribution control device 8 then controls the first lamp unit 2 and the second lamp unit 4 so as to form the determined light distribution patterns (S305) and terminates this routine. If no specific target A is included (N at S303), the process proceeds to step S305, skipping step S304.

With the vehicular lamp system 1 according to the present embodiment described thus far as well, as with Embodiment 1, the visibility of the driver of the host vehicle can be increased. Furthermore, according to the present embodiment, the first lamp unit 2 forms an illuminance fixed pattern 46, the second lamp unit 4 forms an illuminance adjusted pattern 48, and these two light distribution patterns are superposed on each other to form a combined mid-illuminance pattern 44. Thus, the light distribution control can be simplified, as compared with a case in which a combined mid-illuminance pattern 44 is formed through feedback control executed in the two lamp units. As a result, the light distribution control can be accelerated and stabilized, and the load on the light distribution control device 8 can be reduced. Furthermore, forming the illuminance adjusted pattern 48 can vary the illuminance of the combined mid-illuminance pattern 44 in accordance with, for example, the difference in reflectance between light reflective objects. Thus, the visibility of the driver of the host vehicle can be further increased.

Furthermore, according to the present embodiment, the first lamp unit 2, the second lamp unit 4, and the imaging device 6 are disposed inside the lamp room 14. Disposing the imaging device 6 inside the lamp room 14 reduces the need for a process of correcting parallax between the imaging device 6 and the first lamp unit 2 and second lamp unit 4. Furthermore, disposing the light distribution control device 8 inside the lamp room 14 reduces the communication time between the imaging device 6 and the light distribution control device 8. Therefore, as compared with a case in which the imaging device 6 is disposed outside the lamp room 14, an increase in the load on the light distribution control device 8 is more likely to be suppressed. Furthermore, as compared with a case in which the imaging device 6 is disposed outside the lamp room 14, the accuracy of position information obtained of a target tends to be higher.

Executing feedback control in the second lamp unit 4 having a higher resolving power exerts more load on the light distribution control device 8. However, when the imaging device 6 is disposed inside the lamp room 14, the process of correcting parallax can be omitted, or the communication time can be reduced, for example. Thus, the load on the light distribution control device 8 can be reduced more easily. Therefore, if the imaging device 6 is disposed inside the lamp room 14, by forming an illuminance adjusted pattern 48 by the second lamp unit 4 as in the present embodiment, the driver's visibility can be increased by forming a higher-accuracy light distribution pattern, while keeping any unnecessary load from being exerted on the light distribution control device 8.

Embodiment 4

Embodiment 4 has a configuration common to the configuration of Embodiment 3 except in the contents of control by a light distribution control device 8. The present embodiment will be described below with the description centered on its configuration that differs from the configuration of Embodiment 3, and description of configurations that are common to both embodiments will be simplified or omitted.

A vehicular lamp system 1 according to the present embodiment includes a first lamp unit 2, a second lamp unit 4, an imaging device 6, and a light distribution control device 8. The first lamp unit 2, the second lamp unit 4, the imaging device 6, and the light distribution control device 8 are disposed inside a lamp room 14 (see FIG. 9).

The first lamp unit 2 includes a first light source group 16, a second light source group 18, a circuit board 20, a heat sink 22, a shade member 24, a lens holder 26, and a projection lens 28. The first lamp unit 2 can form a low beam light distribution pattern PL by projecting light from the first light source group 16. Furthermore, the first lamp unit 2 can form a first light distribution variable pattern PV1 formed by a set of partial regions R1 arrayed in the horizontal direction, by projecting a visible light beam L1 from the second light source group 18.

The second lamp unit 4 includes a light source array 30. The second lamp unit 4 can form a second light distribution variable pattern PV2 formed by a set of partial regions R2 arrayed in a matrix, by projecting light from the light source array 30. The second lamp unit 4 has a higher resolving power than the first lamp unit 2.

The light distribution control device 8 controls formation of light distribution patterns by the first lamp unit 2 and the second lamp unit 4 in accordance with a target included in an image IMG that is based on the imaging device 6. The light distribution control device 8 includes a situation determining unit 36 and a pattern determining unit 38.

The light distribution control device 8 forms a combined shading pattern 40 in regard to a forward vehicle V. Specifically, the pattern determining unit 38 sets, in a first light distribution variable pattern PV1, a shading pattern 40a that overlaps a forward vehicle V. Furthermore, the pattern determining unit 38 sets, in a second light distribution variable pattern PV2, a shading pattern 40b that overlaps the forward vehicle V. The pattern determining unit 38 then controls the first lamp unit 2 so as to form the first light distribution variable pattern PV1 that includes the shading pattern 40*a* and controls the second lamp unit 4 so as to form the second light distribution variable pattern PV2 that includes the shading pattern 40*b*. Thus, the shading pattern 40*a* and the shading pattern 40*b* become superposed on each other to form a combined shading pattern 40 in regard to the forward vehicle V.

Meanwhile, the pattern determining unit 38 forms a combined high-illuminance pattern 42 in a region where no target is present. Specifically, the pattern determining unit 38 sets, in a first light distribution variable pattern PV1, a high-illuminance pattern 42*a* that overlaps a region where no target is present. Furthermore, the pattern determining unit 38 sets, in a second light distribution variable pattern PV2, a high-illuminance pattern 42*b* that overlaps the region where no target is present. The pattern determining unit 38 then controls the first lamp unit 2 so as to form the first light distribution variable pattern PV1 that includes the high-illuminance pattern 42*a* and controls the second lamp unit 4 so as to form the second light distribution variable pattern PV2 that includes the high-illuminance pattern 42*b*. Thus, the high-illuminance pattern 42*a* and the high-illuminance pattern 42*b* become superposed on each other to form a combined high-illuminance pattern 42 in the region where no target is present.

Figure 12A:
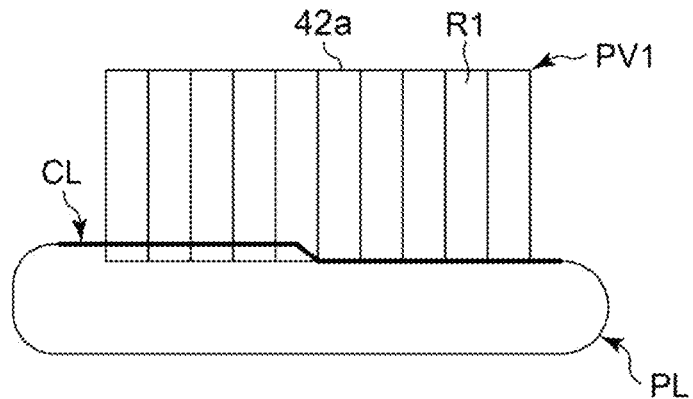
FIGS. 12A, 12B, 12C, 12D and 12E are schematic diagrams showing light distribution patterns that a first lamp unit and a second lamp unit form in a situation in which a specific target is present and in a situation in which no specific target is present.
Figure 12C:
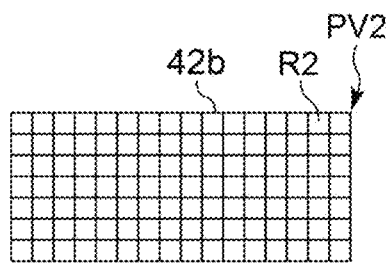
Figure 12B:
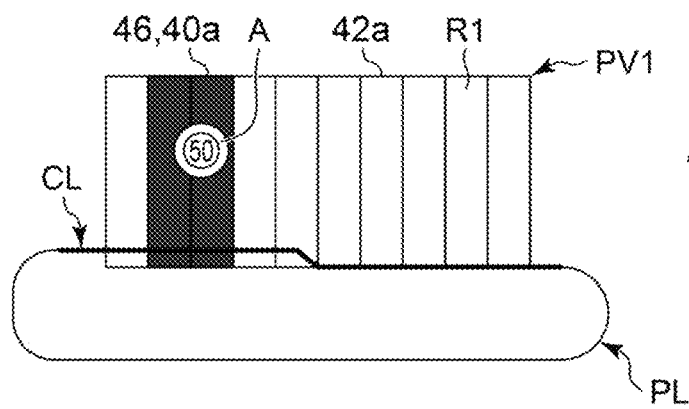
Figure 12D:
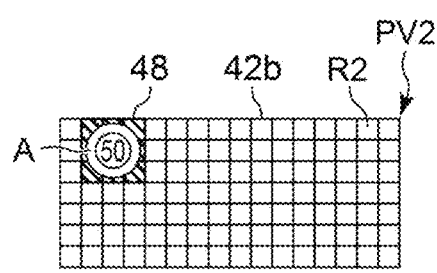
Figure 12E:
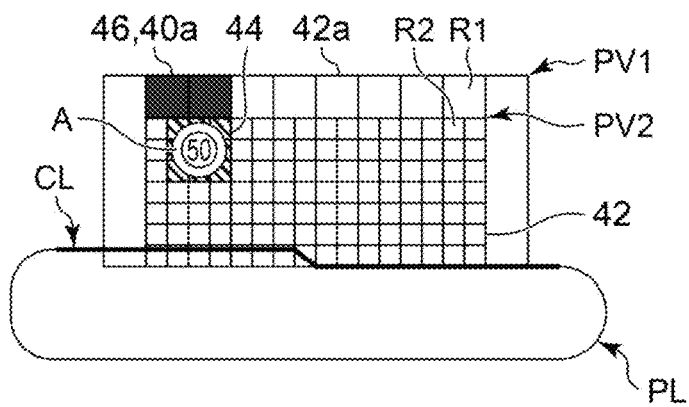

The light distribution control device 8 executes the following light distribution control in regard to a specific target A among targets present ahead of the host vehicle. FIGS. 12A to 12E are schematic diagrams showing light distribution patterns that the first lamp unit 2 and the second lamp unit 4 form in a situation in which the specific target A is present and in a situation in which the specific target A is not present. FIG. 12A shows a light distribution pattern that the first lamp unit 2 forms in a situation in which the specific target A is not present. FIG. 12B shows a light distribution pattern that the first lamp unit 2 forms in a situation in which the specific target A is present. FIG. 12C shows a light distribution pattern that the second lamp unit 4 forms in a situation in which the specific target A is not present. FIG. 12D shows a light distribution pattern that the second lamp unit 4 forms in a situation in which the specific target A is present. FIG. 12E shows how, in a situation in which the specific target A is present, the light distribution pattern that the first lamp unit 2 forms and the light distribution pattern that the second lamp unit 4 forms are combined.

The pattern determining unit 38 according to the present embodiment controls the first lamp unit 2 so as to form an illuminance fixed pattern 46 in regard to the specific target A. Furthermore, the pattern determining unit 38 controls the second lamp unit 4 so as to form an illuminance adjusted pattern 48 in regard to the specific target A. Thus, the illuminance fixed pattern 46 and the illuminance adjusted pattern 48 become superposed on each other to form a combined mid-illuminance pattern 44 in regard to the specific target A.

Specifically, the pattern determining unit 38 controls the first lamp unit 2 so as to form a high-illuminance pattern 42*a* when the specific target A is not detected. For example, in a situation in which the specific target A is not present, the pattern determining unit 38 sets the entirety of a first light distribution variable pattern PV1 to the high-illuminance pattern 42*a*, as shown in FIG. 12A. Herein, the pattern includes a shading pattern 40*a* if a forward vehicle V is present. Upon the specific target A being detected, the pattern determining unit 38 sets, within the first light distribution variable pattern PV1, a shading pattern 40*a* that overlaps the specific target A, as shown in FIG. 12B. This shading pattern 40*a* corresponds to the illuminance fixed pattern 46.

The pattern determining unit 38 controls the second lamp unit 4 so as to form a high-illuminance pattern 42*b* when the specific target A is not detected. For example, in a situation in which the specific target A is not present, the pattern determining unit 38 sets the entirety of a second light distribution variable pattern PV2 to the high-illuminance pattern 42*b*, as shown in FIG. 12C. Herein, the pattern includes a shading pattern 40*b* if a forward vehicle V is present. Upon the specific target A being detected, the pattern determining unit 38 sets, within the second light distribution variable pattern PV2, an illuminance adjusted pattern 48 that overlaps the specific target, as shown in FIG. 12D.

The pattern determining unit 38 then controls the first lamp unit 2 so as to form the first light distribution variable pattern PV1 that includes the shading pattern 40*a* and controls the second lamp unit 4 so as to form the second light distribution variable pattern PV2 that includes the illuminance adjusted pattern 48. Thus, the shading pattern 40*a* and the illuminance adjusted pattern 48 become superposed on each other, as shown in FIG. 12E, and a combined mid-illuminance pattern 44 is formed in regard to the specific target A. The combined mid-illuminance pattern 44 has an illuminance that is the sum total of the illuminance of the shading pattern 40*a* and the illuminance of the illuminance adjusted pattern 48. According to the present embodiment, since the illuminance of the shading pattern 40*a* is zero, the illuminance of the combined mid-illuminance pattern 44 is equal to the illuminance of the illuminance adjusted pattern 48. Herein, the pattern determining unit 38 may control the first lamp unit 2 so as to form a first illuminance fixed pattern 46*a* in regard to the specific target A.

A flowchart showing one example of light distribution control according to the present embodiment is substantially identical to the flowchart (FIG. 8) according to Embodiment 2. Specifically, the light distribution control device 8 determines whether a forward vehicle V is included in an image IMG that is based on the imaging device 6 (S201). If a forward vehicle V is included (Y at S201), the light distribution control device 8 sets a shading pattern 40*a* in a first light distribution variable pattern PV1 and sets a shading pattern 40*b* in a second light distribution variable pattern PV2 (S202). The light distribution control device 8 then determines whether a specific target A is included in the image IMG (S203). If no forward vehicle V is included (N at S201), the process proceeds to step S203, skipping step S202.

If a specific target A is included (Y at S203), the light distribution control device 8 sets a shading pattern 40*a* in the first light distribution variable pattern PV1 and sets an illuminance adjusted pattern 48 in the second light distribution variable pattern PV2 (S204). The light distribution control device 8 then controls the first lamp unit 2 and the second lamp unit 4 so as to form the determined light distribution patterns (S205) and terminates this routine. If no specific target A is included (N at S203), the process proceeds to step S205, skipping step S204.

With the vehicular lamp system 1 according to the present embodiment described thus far as well, as with Embodiment 1, the visibility of the driver of the host vehicle can be increased. Furthermore, according to the present embodiment, the first lamp unit 2 forms an illuminance fixed pattern 46, the second lamp unit 4 forms an illuminance adjusted pattern 48, and these two light distribution patterns are superposed on each other to form a combined mid-illuminance pattern 44. Thus, the light distribution control can be simplified, as compared with a case in which a combined mid-illuminance pattern 44 is formed through feedback control executed in the two lamp units. As a result, the light distribution control can be accelerated and stabilized, and the load on the light distribution control device 8 can be reduced. Furthermore, forming the illuminance adjusted pattern 48 can vary the illuminance of the combined mid-illuminance pattern 44 in accordance with, for example, the difference in reflectance between light reflective objects. Thus, the visibility of the driver of the host vehicle can be further increased.

Furthermore, according to the present embodiment, the first lamp unit 2, the second lamp unit 4, and the imaging device 6 are disposed inside the lamp room 14. Then, the first lamp unit 2 having a lower resolving power forms a shading pattern 40a at a fixed illuminance, and the second lamp unit 4 having a higher resolving power forms an illuminance adjusted pattern 48. Thus, the driver's visibility can be increased by forming a higher-accuracy light distribution pattern, while keeping any unnecessary load from being exerted on the light distribution device 8.

Thus far, some embodiments according to the present invention have been described in detail. The embodiments described above merely illustrate some specific examples for implementing the present invention. The contents of the embodiments do not limit the technical scope of the present invention, and a number of design changes, including modifications, additions, and deletions of constituent elements, can be made within a scope that does not depart from the sprit of the invention set forth in the claims. A new embodiment resulting from adding a design change has advantageous effects of embodiments combined as well as the advantageous effects of the modification. With regard to the embodiments described above, the expressions "according to the present embodiment," "in the present embodiment," and so forth are added for emphasis to the contents that can be subjected to such a design change, but such a design change is also permitted on the contents without such an expression. A desired combination of the constituent elements described above is also valid as an aspect of the present invention. Hatching added to a section in the drawings does not limit the material of such with hatching.

The invention according to the embodiments described above may be identified by the items indicated below.

[Item 1]
A vehicular lamp system (1), comprising:
a first lamp unit (2) and a second lamp unit (4) each capable of forming a light distribution pattern (PV1, PV2) of a variable intensity distribution; and
a light distribution control device (8) that controls formation of light distribution patterns (PV1, PV2) by the first lamp unit (2) and the second lamp unit (4) in accordance with a target included in an image (IMG) that is based on an imaging device (6), wherein
the light distribution controlling device (8)
in regard to a region where the target is not present, controls at least one of the first lamp unit (2) or the second lamp unit (4) so as to form high-illuminance patterns (42a, 42b) at a predetermined illuminance, and forms a combined high-illuminance pattern (42) by superposing the light distribution patterns that the first lamp unit (2) and the second lamp unit (4) form,
in regard to a forward vehicle (V) among the targets, controls the first lamp unit (2) and the second lamp unit (4) so as to form shading patterns (40a, 40b) that are not dependent on a luminance of the image (IMG) at an illuminance lower than the illuminance of the high-illuminance patterns (42a, 42b), and forms a combined shading pattern (40) by superposing the shading patterns (40a, 40b) that the first lamp unit (2) and the second lamp unit (4) form, and
in regard to a specific target (A), among the targets, for which a combined mid-illuminance pattern (44) is to be formed at an illuminance lower than an illuminance of the combined high-illuminance pattern (42) and higher than an illuminance of the combined shading pattern (40), controls the first lamp unit (1) so as to form an illuminance fixed pattern (46) that is not dependent on the luminance of the image (IMG), controls the second lamp unit (4) so as to form an illuminance fixed pattern (46) that is not dependent on the luminance of the image (IMG) or to form an illuminance adjusted pattern (48) of which an illuminance is adjusted to bring a luminance of the specific target (A) in the image (IMG) closer to a target luminance, and forms the combined mid-illuminance pattern (44) by superposing the light distribution patterns that the first lamp unit (2) and the second lamp unit (4) form.

[Item 2]
The vehicular lamp system (1) according to Item 1, wherein
in regard to the specific target (A),
the light distribution control device (8)
controls the first lamp unit (2) so as to form a first illuminance fixed pattern (46a) at an illuminance lower than the illuminance of the high-illuminance pattern (42a) and higher than the illuminance of the shading pattern (40a), and
controls the second lamp unit (4) so as to form a second illuminance fixed pattern (46b) at an illuminance lower than the illuminance of the first illuminance fixed pattern (46a).

[Item 3]
The vehicular lamp system (1) according to Item 2, wherein
the light distribution controlling device (8)
controls the first lamp unit (2) so as to form the first illuminance fixed pattern (46a) irrespective of presence or absence of the specific target (A), and
controls the second lamp unit (4) so as to form the high-illuminance pattern (42b) when the specific target (A) is not detected and to form the second illuminance fixed pattern (46b) when the specific target (A) is detected.

[Item 4]
The vehicular lamp system (1) according to Item 2 or 3, wherein
the first lamp unit (2) and the second lamp unit (4) are disposed inside a lamp room (14), and
the imaging device (6) is disposed outside the lamp room (14).

[Item 5]
The vehicular lamp system (1) according to Item 1, wherein
in regard to the specific target (A),
the light distribution control device (8)
controls the first lamp unit (2) so as to form the shading pattern (40a) or to form a first illuminance fixed pattern (46a) at an illuminance lower than the illuminance of the high-illuminance pattern (42*a*) and higher than the illuminance of the shading pattern (40*a*), and controls the second lamp unit (4) so as to form the illuminance adjusted pattern (48).

[Item 6]

The vehicular lamp system (1) according to Item 5, wherein the light distribution controlling device (8)

controls the first lamp unit (2) so as to form the high-illuminance pattern (42*a*) when the specific target (A) is not detected or to form the shading pattern (40*a*) or the first illuminance fixed pattern (46*a*) when the specific target (A) is detected, and controls the second lamp unit (4) so as to form the high-illuminance pattern (42*b*) when the specific target (A) is not detected and to form the illuminance adjusted pattern (48) when the specific target (A) is detected.

[Item 7]

The vehicular lamp system (1) according to Item 5, wherein the light distribution controlling device (8)

controls the first lamp unit (2) so as to form the first illuminance fixed pattern (46*a*) irrespective of presence or absence of the specific target (A), and controls the second lamp unit (4) so as to form the high-illuminance pattern (42*b*) when the specific target (A) is not detected and to form the illuminance adjusted pattern (48) when the specific target (A) is detected.

[Item 8]

The vehicular lamp system (1) according to Item 6, wherein the first lamp unit (2) has a higher resolving power than the second lamp unit (4), the first lamp unit (2) and the second lamp unit (4) are disposed inside a lamp room (14), and the imaging device (6) is disposed outside the lamp room (14).

[Item 9]

The vehicular lamp system (1) according to Item 6 or 7, wherein the second lamp unit (4) has a higher resolving power than the first lamp unit (2), and the first lamp unit (2), the second lamp unit (4), and the imaging device (6) are disposed inside a lamp room (14).

[Item 10]

A light distribution control device (8) that controls formation of light distribution patterns (PV1, PV2) by a first lamp unit (2) and a second lamp unit (4) that are each capable of forming a light distribution pattern (PV1, PV2) of a variable intensity distribution in accordance with a target included in an image (IMG) that is based on an imaging device (6), wherein the light distribution control device (8):

in regard to a region where the target is not present, controls at least one of the first lamp unit (2) or the second lamp unit (4) so as to form high-illuminance patterns (42*a*, 42*b*) at a predetermined illuminance, and forms a combined high-illuminance pattern (42) by superposing the light distribution patterns that the first lamp unit (2) and the second lamp unit (4) form;

in regard to a forward vehicle (V) among the targets, controls the first lamp unit (2) and the second lamp unit (4) so as to form shading patterns (40*a*, 40*b*) that are not dependent on a luminance of the image (IMG) at an illuminance lower than the illuminance of the high-illuminance patterns (42*a*, 42*b*), and forms a combined shading pattern (40) by superposing the shading patterns (40*a*, 40*b*) that the first lamp unit (2) and the second lamp unit (4) form; and in regard to a specific target (A), among the targets, for which a combined mid-illuminance pattern (44) is to be formed at an illuminance lower than an illuminance of the combined high-illuminance pattern (42) and higher than an illuminance of the combined shading pattern (40), controls the first lamp unit (2) so as to form an illuminance fixed pattern (46) that is not dependent on the luminance of the image (IMG), controls the second lamp unit (4) so as to form an illuminance fixed pattern (46) that is not dependent on the luminance of the image (IMG) or to form an illuminance adjusted pattern (48) of which an illuminance is adjusted to bring a luminance of the specific target (A) in the image (IMG) closer to a target luminance, and forms the combined mid-illuminance pattern (44) by superposing the light distribution patterns that the first lamp unit (2) and the second lamp unit (4) form.

[Item 11]

A light distribution control method of controlling formation of light distribution patterns (PV1, PV2) by a first lamp unit (2) and a second lamp unit (4) that are each capable of forming a light distribution pattern (PV1, PV2) of a variable intensity distribution in accordance with a target included in an image (IMG) that is based on an imaging device (6), the light distribution control method comprising:

in regard to a region where the target is not present, controlling at least one of the first lamp unit (2) or the second lamp unit (4) so as to form high-illuminance patterns (42*a*, 42*b*) at a predetermined illuminance, and forming a combined high-illuminance pattern (42) by superposing the light distribution patterns that the first lamp unit (2) and the second lamp unit (4) form;

in regard to a forward vehicle (V) among the targets, controlling the first lamp unit (2) and the second lamp unit (4) so as to form shading patterns (40*a*, 40*b*) that are not dependent on a luminance of the image (IMG) at an illuminance lower than the illuminance of the high-illuminance patterns (42*a*, 42*b*), and forming a combined shading pattern (40) by superposing the shading patterns (40*a*, 40*b*) that the first lamp unit (2) and the second lamp unit (4) form; and in regard to a specific target (A), among the targets, for which a combined mid-illuminance pattern (44) is to be formed at an illuminance lower than an illuminance of the combined high-illuminance pattern (42) and higher than an illuminance of the combined shading pattern (40), controlling the first lamp unit (2) so as to form an illuminance fixed pattern (46) that is not dependent on the luminance of the image (IMG), controlling the second lamp unit (4) so as to form an illuminance fixed pattern (46) that is not dependent on the luminance of the image (IMG) or to form an illuminance adjusted pattern (48) of which an illuminance is adjusted to bring a luminance of the specific target (A) in the image (IMG) closer to a target luminance, and forming the combined mid-illuminance pattern (44) by superposing the light distribution patterns that the first lamp unit (2) and the second lamp unit (4) form.

What is claimed is:

1. A vehicular lamp system, comprising:
a first lamp unit and a second lamp unit each capable of forming a light distribution pattern of a variable intensity distribution; and
a light distribution control device that controls formation of light distribution patterns by the first lamp unit and the second lamp unit in accordance with a target included in an image that is based on an imaging device, wherein
the light distribution control device
in regard to a region where the target is not present, controls at least one of the first lamp unit or the second lamp unit so as to form high-illuminance patterns at a predetermined illuminance, and forms a combined high-illuminance pattern by superposing the light distribution patterns that the first lamp unit and the second lamp unit form,
in regard to a forward vehicle among the targets, controls the first lamp unit and the second lamp unit so as to form shading patterns that are not dependent on a luminance of the image at an illuminance lower than the illuminance of the high-illuminance patterns, and forms a combined shading pattern by superposing the shading patterns that the first lamp unit and the second lamp unit form, and
in regard to a specific target, among the targets, for which a combined mid-illuminance pattern is to be formed at an illuminance lower than an illuminance of the combined high-illuminance pattern and higher than an illuminance of the combined shading pattern, controls the first lamp unit so as to form an illuminance fixed pattern that is not dependent on the luminance of the image, controls the second lamp unit so as to form an illuminance fixed pattern that is not dependent on the luminance of the image or to form an illuminance adjusted pattern of which an illuminance is adjusted to bring a luminance of the specific target in the image closer to a target luminance, and forms the combined mid-illuminance pattern by superposing the light distribution patterns that the first lamp unit and the second lamp unit form.

2. The vehicular lamp system according to claim 1, wherein
in regard to the specific target,
the light distribution control device
controls the first lamp unit so as to form a first illuminance fixed pattern at an illuminance lower than the illuminance of the high-illuminance pattern and higher than the illuminance of the shading pattern, and
controls the second lamp unit so as to form a second illuminance fixed pattern at an illuminance lower than the illuminance of the first illuminance fixed pattern.

3. The vehicular lamp system according to claim 2, wherein
the light distribution control device
controls the first lamp unit so as to form the first illuminance fixed pattern irrespective of presence or absence of the specific target, and
controls the second lamp unit so as to form the high-illuminance pattern when the specific target is not detected and to form the second illuminance fixed pattern when the specific target is detected.

4. The vehicular lamp system according to claim 2, wherein
the first lamp unit and the second lamp unit are disposed inside a lamp room, and
the imaging device is disposed outside the lamp room.

5. The vehicular lamp system according to claim 1, wherein
in regard to the specific target,
the light distribution control device
controls the first lamp unit so as to form the shading pattern or to form a first illuminance fixed pattern at an illuminance lower than the illuminance of the high-illuminance pattern and higher than the illuminance of the shading pattern, and
controls the second lamp unit so as to form the illuminance adjusted pattern.

6. The vehicular lamp system according to claim 5, wherein
the light distribution control device
controls the first lamp unit so as to form the high-illuminance pattern when the specific target is not detected and to form the shading pattern or the first illuminance fixed pattern when the specific target is detected, and
controls the second lamp unit so as to form the high-illuminance pattern when the specific target is not detected and to form the illuminance adjusted pattern when the specific target is detected.

7. The vehicular lamp system according to claim 5, wherein
the light distribution control device
controls the first lamp unit so as to form the first illuminance fixed pattern irrespective of presence or absence of the specific target, and
controls the second lamp unit so as to form the high-illuminance pattern when the specific target is not detected and to form the illuminance adjusted pattern when the specific target is detected.

8. The vehicular lamp system according to claim 6, wherein
the first lamp unit has a higher resolving power than the second lamp unit,
the first lamp unit and the second lamp unit are disposed inside a lamp room, and
the imaging device is disposed outside the lamp room.

9. The vehicular lamp system according to claim 6, wherein
the second lamp unit has a higher resolving power than the first lamp unit, and
the first lamp unit, the second lamp unit, and the imaging device are disposed inside a lamp room.

10. A light distribution control device that controls formation of light distribution patterns by a first lamp unit and a second lamp unit that are each capable of forming a light distribution pattern of a variable intensity distribution in accordance with a target included in an image that is based on an imaging device, wherein the light distribution control device:
in regard to a region where the target is not present, controls at least one of the first lamp unit or the second lamp unit so as to form high-illuminance patterns at a predetermined illuminance, and forms a combined high-illuminance pattern by superposing the light distribution patterns that the first lamp unit and the second lamp unit form;
in regard to a forward vehicle among the targets, controls the first lamp unit and the second lamp unit so as to form shading patterns that are not dependent on a luminance of the image at an illuminance lower than the illuminance of the high-illuminance patterns, and forms a combined shading pattern by superposing the shading patterns that the first lamp unit and the second lamp unit form; and in regard to a specific target, among the targets, for which a combined mid-illuminance pattern is to be formed at an illuminance lower than an illuminance of the combined high-illuminance pattern and higher than an illuminance of the combined shading pattern, controls the first lamp unit so as to form an illuminance fixed pattern that is not dependent on the luminance of the image, controls the second lamp unit so as to form an illuminance fixed pattern that is not dependent on the luminance of the image or to form an illuminance adjusted pattern of which an illuminance is adjusted to bring a luminance of the specific target in the image closer to a target luminance, and forms the combined mid-illuminance pattern by superposing the light distribution patterns that the first lamp unit and the second lamp unit form.

11. A light distribution control method of controlling formation of light distribution patterns by a first lamp unit and a second lamp unit that are each capable of forming a light distribution pattern of a variable intensity distribution in accordance with a target included in an image that is based on an imaging device, the light distribution control method comprising:

in regard to a region where the target is not present, controlling at least one of the first lamp unit or the second lamp unit so as to form high-illuminance patterns at a predetermined illuminance, and forming a combined high-illuminance pattern by superposing the light distribution patterns that the first lamp unit and the second lamp unit form;

in regard to a forward vehicle among the targets, controlling the first lamp unit and the second lamp unit so as to form shading patterns that are not dependent on a luminance of the image at an illuminance lower than the illuminance of the high-illuminance patterns, and forming a combined shading pattern by superposing the shading patterns that the first lamp unit and the second lamp unit form; and in regard to a specific target, among the targets, for which a combined mid-illuminance pattern is to be formed at an illuminance lower than an illuminance of the combined high-illuminance pattern and higher than an illuminance of the combined shading pattern, controlling the first lamp unit so as to form an illuminance fixed pattern that is not dependent on the luminance of the image, controlling the second lamp unit so as to form an illuminance fixed pattern that is not dependent on the luminance of the image or to form an illuminance adjusted pattern of which an illuminance is adjusted to bring a luminance of the specific target in the image closer to a target luminance, and forming the combined mid-illuminance pattern by superposing the light distribution patterns that the first lamp unit and the second lamp unit form.

* * * * *